US012627771B1

(12) United States Patent
Nelson et al.

(10) Patent No.: US 12,627,771 B1
(45) Date of Patent: May 12, 2026

(54) DYNAMIC CONTENT IN VIRTUAL BACKGROUND

(71) Applicant: Zoom Communications, Inc., San Jose, CA (US)

(72) Inventors: Lara Marie Nelson, San Jose, CA (US); Brandon Kevin Roper, Washington, UT (US)

(73) Assignee: Zoom Communications, Inc., San Jose, CA (US)

( * ) Notice: Subject to any disclaimer, the term of this patent is extended or adjusted under 35 U.S.C. 154(b) by 204 days.

(21) Appl. No.: 18/305,214

(22) Filed: Apr. 21, 2023

(51) Int. Cl.
| | |
|---|---|
| *H04N 7/15* | (2006.01) |
| *G06T 7/194* | (2017.01) |
| *H04N 5/272* | (2006.01) |

(52) U.S. Cl.
CPC ............. *H04N 7/157* (2013.01); *G06T 7/194* (2017.01); *H04N 5/272* (2013.01); *H04N 7/152* (2013.01)

(58) Field of Classification Search
CPC ........ H04N 7/157; H04N 5/272; H04N 7/152; G06T 7/194
See application file for complete search history.

(56) References Cited

U.S. PATENT DOCUMENTS

| | | | |
|---|---|---|---|
| 6,853,398 | B2 | 2/2005 | Malzbender et al. |
| 7,788,323 | B2 | 8/2010 | Greenstein et al. |
| 8,275,197 | B2 | 9/2012 | Hawkins et al. |
| 9,503,685 | B2 | 11/2016 | Baron, Jr. et al. |
| 12,260,559 | B2 | 3/2025 | Nicholson et al. |

| | | | | |
|---|---|---|---|---|
| 2001/0035976 | A1* | 11/2001 | Poon ................... | H04N 1/00244 |
| | | | | 358/1.15 |
| 2008/0030621 | A1 | 2/2008 | Ciudad et al. | |
| 2010/0031149 | A1 | 2/2010 | Gentile et al. | |
| 2010/0313172 | A1 | 12/2010 | Hirahara | |
| 2012/0011454 | A1* | 1/2012 | Droz ................... | G06Q 30/0241 |
| | | | | 715/758 |
| 2013/0147794 | A1* | 6/2013 | Lee ..................... | G06F 3/04842 |
| | | | | 345/419 |
| 2017/0308398 | A1 | 10/2017 | Pinto et al. | |

(Continued)

FOREIGN PATENT DOCUMENTS

| | | |
|---|---|---|
| WO | 2006039863 A1 | 4/2006 |

OTHER PUBLICATIONS

How Can I Create A Slideshow Background in MS Teams, https://answers.microsoft.com/en-us/msteams/forum/all/how-can-i-create-a-slideshow-background-in-ms/e0b514bb-46b7-444c-ad0c-44267ea5758e, MKingsley, May 12, 20220, 4 pages.

(Continued)

*Primary Examiner* — Phung-Hoang J Nguyen
(74) *Attorney, Agent, or Firm* — Young Basile Hanlon & MacFarlane, P.C.

(57) ABSTRACT

An indication of a portion of a virtual background associated with dynamic content is received from a conference participant. A dynamic content source is received from the conference participant. While a condition related to setting the portion of the virtual background based on the dynamic content is met, the following steps are performed. New content is obtained from the dynamic content source. An image associated with the conference participant that includes the new content within the portion of the virtual background is generated. The image is transmitted for display at a device of another conference participant of a conference that includes the conference participant.

19 Claims, 15 Drawing Sheets

(56)        References Cited

U.S. PATENT DOCUMENTS

| | | | |
|---|---|---|---|
| 2022/0217304 A1* | 7/2022 | Gandhi | .................. G06V 40/28 |
| 2022/0343543 A1 | 10/2022 | Sengupta et al. | |
| 2023/0138434 A1 | 5/2023 | Thiel | |
| 2023/0246864 A1 | 8/2023 | Mayes | |
| 2023/0316534 A1 | 10/2023 | Springer | |
| 2023/0353612 A1 | 11/2023 | Springer | |
| 2023/0379426 A1 | 11/2023 | Stone et al. | |
| 2023/0409271 A1 | 12/2023 | Agrawal et al. | |
| 2025/0004799 A1* | 1/2025 | Li | ........................... G06F 9/451 |

OTHER PUBLICATIONS

Change Background And Apply Visual Effects In Google Meet, https://support.google.com/meet/answer/10058482?hl=en&co=GENIE. Platform%3DDesktop, Apr. 21, 2023, 2 pages.

Warm Leads Are Knocking On Your Door, But You're Not Answering, Warmly, https://www.warmly.ai/, Apr. 21, 2023, 10 pages.

Desktop Live Wallpapers, Microsoft, https://apps.microsoft.com/store/detail/desktop-live-wallpapers/9NZ370XBFQMG?hl=en-us &gl=us, Apr. 21, 2023, 3 pages.

How-To Geek, How To Change Windows 10s Wallpaper Based on Time of Day, https://www.howtogeek.com/355912/how-to-change-windows-10s-wallpaper-based on-time-of-day/, Chris Hoffman, Jun. 15, 2018, 17 pages.

Gadget Hacks, Change Your Wallpaper Automatically by Time, Day, Location & More, https://android.gadgethacks.com/how-to/change-your-wallpaper-automatically-by-time-day-location-more-0172629/, Dallas Thomas, Aug. 5, 2016, 8 pages.

Youtube, Get a Contextually-Aware Wallpaper for Android [How-To], Gadget Hacks, https://www.youtube.com/watch?v=KpdelkltyoA &t=78s, Aug. 5, 2016, 2 pages.

Youtube, What eigenvalues and eigenvectors mean geometrically, Dr. Trefor Bazett, https://www.youtube.com/watch?v=4wTHFmZPhTO, Jun. 26, 2017, 3 pages.

Youtube, 3 Essential Excel Skills for the data analyst, Access Analytic, https://www.youtube.com/watch?v=11XeDS-GLbg, Jul. 4, 2021, 2 pages.

Youtube, Build the Ultimate Excel Dashboard from Scratch, Kenji Explains, https://www.youtube.com/watch?v=5eLtjO2Hfs0, Aug. 21, 2022, 3 pages.

Microsoft, Engage Your Audience With Presenter Modes, https://support.microsoft.com/en-gb/office/engage-your-audience-with-presenter-modes-a3599bcb-bb35-4e9c-8dbb-72775eb91e04, Apr. 21, 2023, 9 pages.

\* cited by examiner

DISPLAY MODE:
634

TIME OUT

○ SIZE TO FIT
● OVERFLOW

☑ STOP AFTER
5 MINS ▾
636

REPRESENTATION HANDLING
638

640

○ MOVE OUT OF THE WAY
642

● MOVE TO: BOTTOM RIGHT ▾
644

646

○ AUTO SET SIZE
648

● SHRINK BY: 50%
650

SAVE

CANCEL

RULE NAME: SHOW SCORE
662

RULE TYPE: ○ RECEIVE ● GET
664        666

REFRESH: EVERY 5 MINUTES ▾

SOURCE DETAILS:
668

● OPEN ○ AUTHENTICATED ○ BUILT IN
672

○ CUSTOM ○ INTEGRATED
670

CALL STRING: HTTP://ASERVER/V1/GETSCORES

INCLUDE: USER_IDENTITY
         USER_LOCATION
         USER_DOMAIN
676

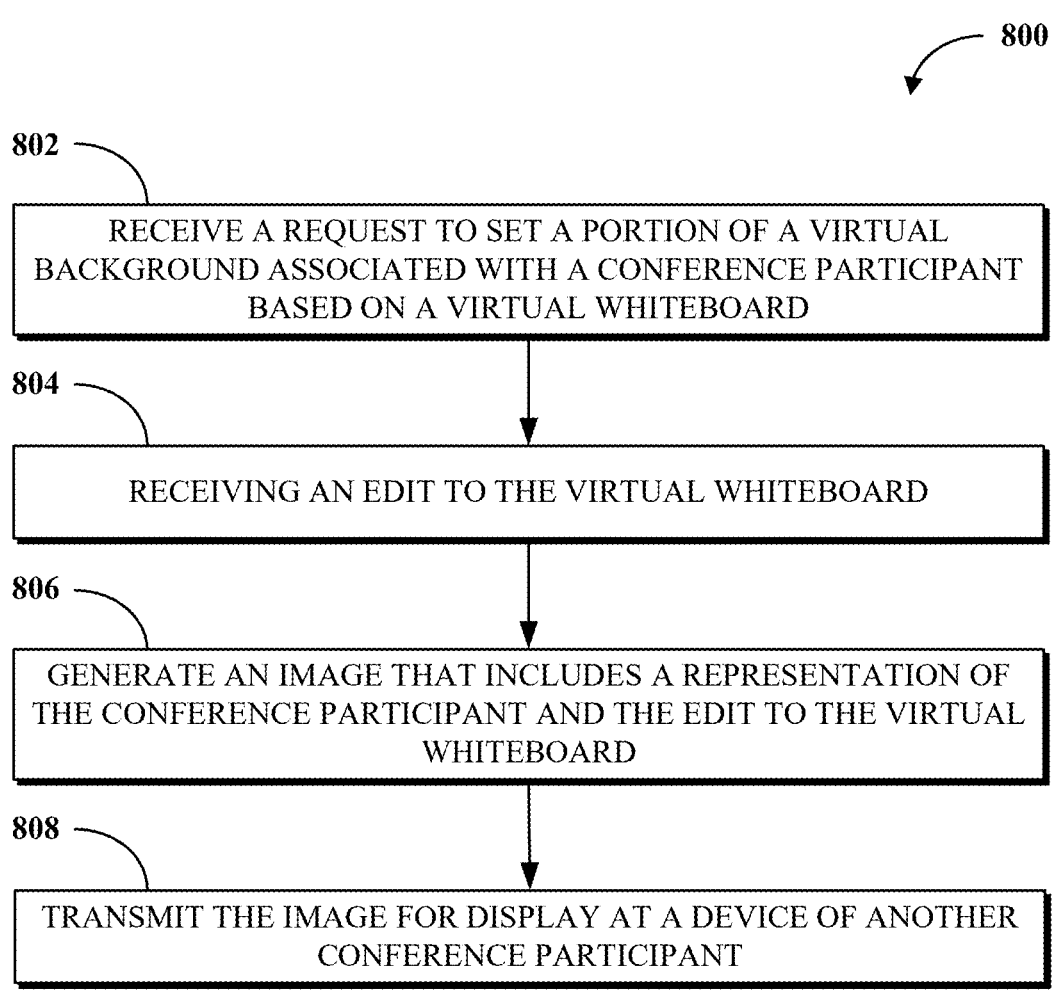

800

802
RECEIVE A REQUEST TO SET A PORTION OF A VIRTUAL BACKGROUND ASSOCIATED WITH A CONFERENCE PARTICIPANT BASED ON A VIRTUAL WHITEBOARD

804
RECEIVING AN EDIT TO THE VIRTUAL WHITEBOARD

806
GENERATE AN IMAGE THAT INCLUDES A REPRESENTATION OF THE CONFERENCE PARTICIPANT AND THE EDIT TO THE VIRTUAL WHITEBOARD

808
TRANSMIT THE IMAGE FOR DISPLAY AT A DEVICE OF ANOTHER CONFERENCE PARTICIPANT

FIG. 8

DYNAMIC CONTENT IN VIRTUAL BACKGROUND

FIELD

This disclosure relates generally to communication management and, more specifically, to including dynamic content in virtual backgrounds (VBGs).

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIGS. 6A-6F illustrate examples of setting portions of VBGs based on dynamic content from dynamic content sources.

FIG. 8 is a flowchart of an example of a technique for setting a portion of a VBG based on dynamic content from a whiteboard.

DETAILED DESCRIPTION

Figure 1:
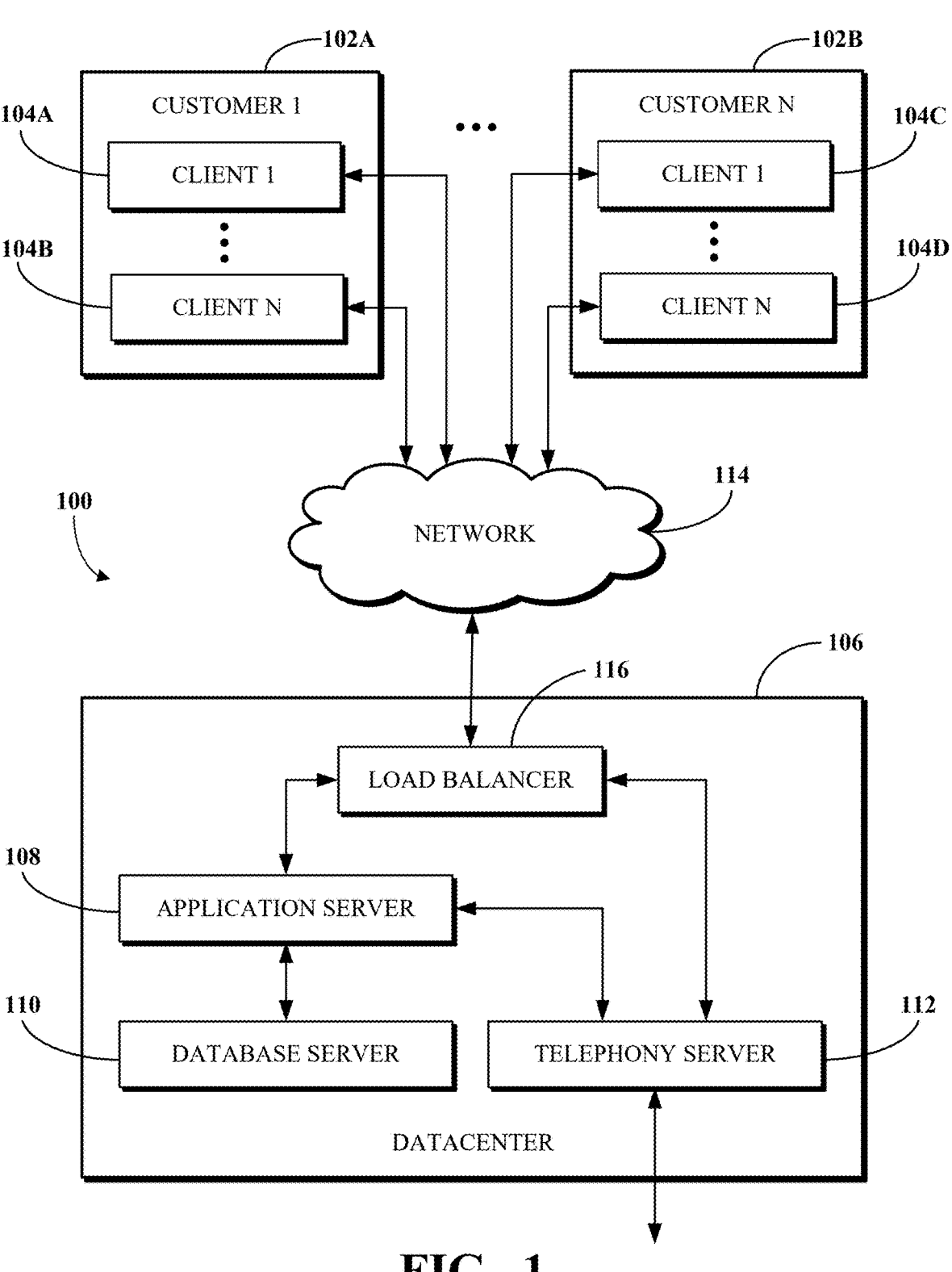
FIG. 1 is a block diagram of an example of an electronic computing and communications system.

A conferencing software, which may be standalone software or part of a software platform such as a unified communications as a service (UCaaS) platform, may allow conference participants to participate in audio-visual conferences. To visually participate in a conference, a user may enable use of their camera (e.g., a front-facing webcam) with the conferencing software. The conferencing software may obtain a video feed of the participant for transmission to other participants of the conference.

A conference participant may in some cases use a background replacement media item in place of the actual background of the conference participant. A background replacement media item may also be referred to as a VBG. The conference participant may select a VBG within a client-side conferencing software (e.g., a conferencing software) that is included in an application executable on a device of the user. A VBG is media data used to mask (e.g., overlay, overwrite, or replace) portions of one or more images of a video feed of the conference participant. The portion of an image that is masked by the VBG is referred to as a background segment of the image. The VBG may be a single image or may include multiple images. For example, the VBG may be an image file, a video file, an animation file (such as a Graphics Interchange Format (GIF) file), or a streaming video. The conferencing software or a component (e.g., tool, software, or application) associated therewith may process images (e.g., video frames) of an image stream (e.g., a video feed) of the user to replace the actual background captured by the camera with a corresponding (e.g., co-located and co-extensive) portion from the VBG.

VBGs as described above are static in that once a conference participant sets a VBG, that VBG remains the same until changed again by the conference participant. Static VBGs may not elicit sufficient interest or engagement by conference participants. It is desirable that VBGs reflect, in real-time, actual (e.g., current) conditions, aspects, properties, or the like (collectively, characteristics) related to conference participants or that VBGs of conference participants automatically change as the characteristics change during a conference.

However, conventional conferencing software approaches lack the technical capabilities for solving or for enabling solutions to such problems. At best, and as described above, conventional conferencing software may merely include technical capabilities that participants can use to set VBGs.

Additionally, conventional conferencing software may enable a conference participant to share (e.g., display) dynamic content during a conference. To do so, the conference participant may screen-share an application (e.g., a whiteboard), a document, or some other window displayed at their device. To illustrate, and without limitations, the conference participant may wish to share an application (e.g., a whiteboard) in order to walk through a step-by-step solution to a mathematical problem or to describe a mockup of a user interface design. However, by enabling (e.g., setting or turning on) a screen-share, the faces of each of the conference participants, as displayed to the other conference participants, may be reduced and may be moved to screen edges so that the shared whiteboard or document may be prominently displayed in a center stage. Such a conventional approach for sharing content results in a sub-optimal user experience because it takes the focus away from the faces of the conference participants.

Implementations according to this disclosure enable a conference participant to set at least a portion of their virtual background based on a whiteboard. Contents from the whiteboard can be overlayed over a portion of the virtual background of the conference participant or can completely replace the virtual background. The conference participant can have a whiteboard open on their desktop. Any changes that the conference participant (or another user who may or may not be a conference participant) makes to the whiteboard are then reflected in their virtual background and are seen by all other participants.

More generally, a conferencing software according to implementations of this disclosure can dynamically set (e.g., change during an ongoing conference) the VBG (or portions thereof) for a conference participant based on content obtained from a source of dynamic content (i.e., a dynamic content source). Dynamically setting a portion of a VBG based on content obtained from a dynamic content source may be enabled using VBG rules. A conference participant may select a pre-created VBG rule (e.g., one or more VBG rules) that is used to dynamically set a VBG (or portion thereof) for the conference participant. A dynamic content source provides, based on a characteristic of a conference participant, dynamic content that the conferencing software can use to set a target VBG (or a portion thereof) for the conference participant.

As used herein, "dynamic content" means content that may be changed during, but independent (e.g., outside) of a conference. Dynamic content does not necessarily mean that the content will in fact change during the conference. To illustrate, a conference participant may, separate from the conference, write the misspelled message "Happy Birthday, Bteh!" on a whiteboard. The conference participant may indicate that the portion of the whiteboard that includes the message is to be used to set a portion of the VBG for the conference participant. The conference participant may not in fact change the message while the conference is ongoing. Alternatively, the conference participant may notice the misspelling, and, separate from the conference, use a whiteboard software to correct the message to "Happy Birthday, Beth!" The edit (e.g., modification) to the whiteboard is then reflected in the portion of the VBG of the conference participant.

To describe some implementations in greater detail, reference is first made to examples of hardware and software structures used to implement a system for setting at least a portion of a VBG based on dynamic content, such as content of a whiteboard. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, one or more of the clients 104A through 104D or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
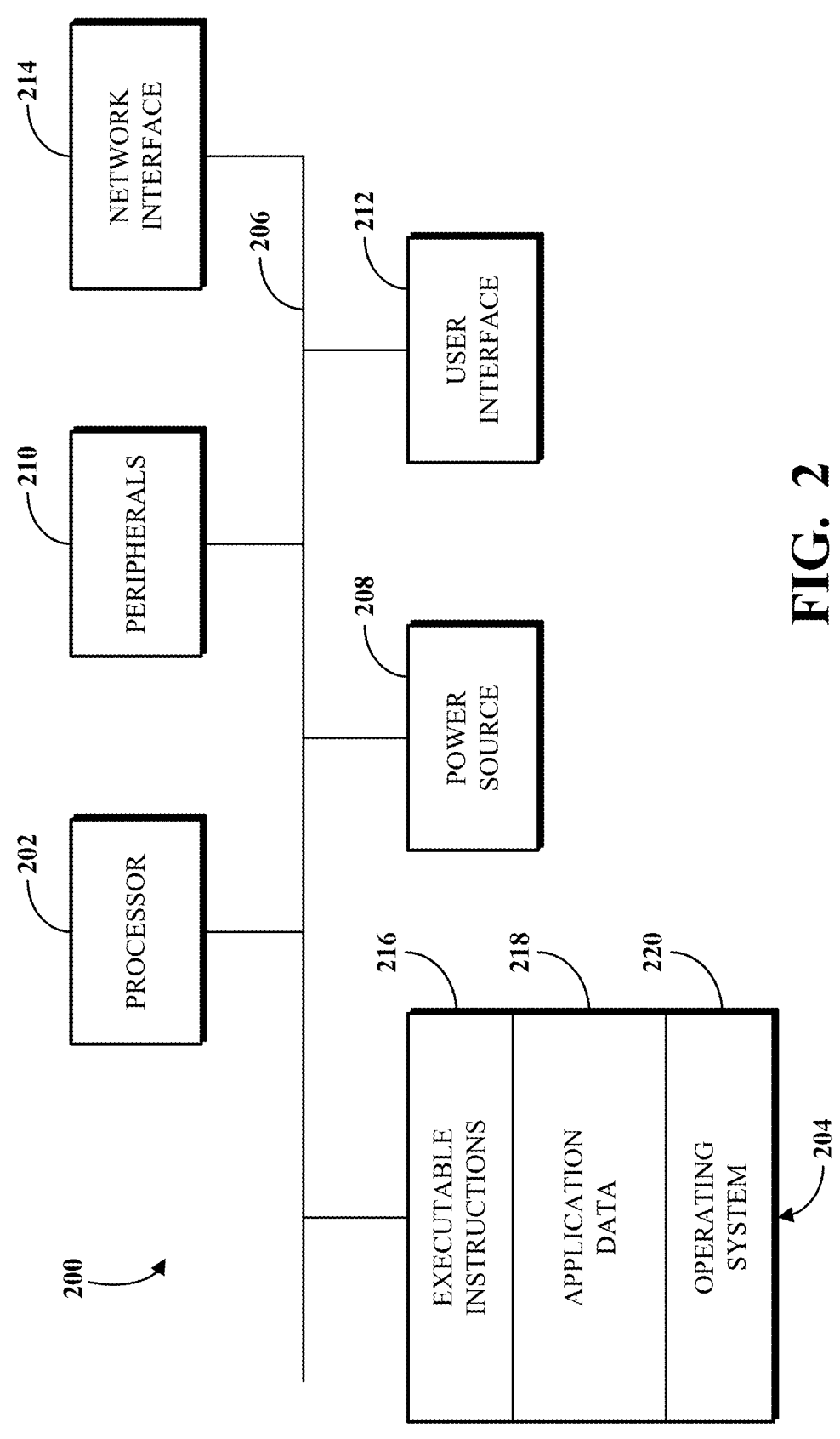
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the clients 104A through 104D, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
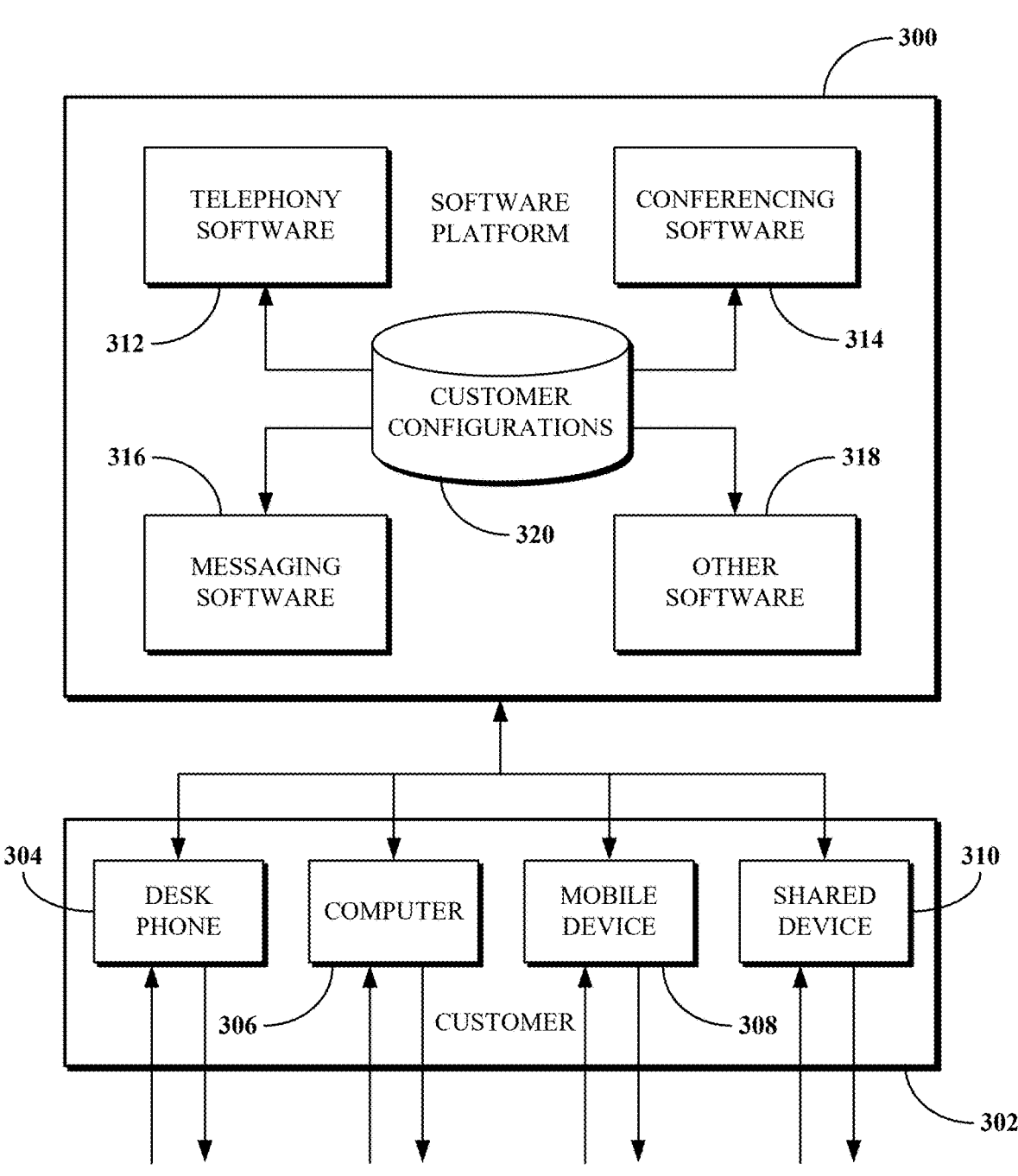
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients 304 through 310 (e.g., the clients 304, 306, 308, 310)—a desk phone, a computer, a mobile device, and a shared device. The desk phone is a desktop unit configured to at least send and receive calls and includes an input device for receiving a telephone number or extension to dial to and an output device for outputting audio and/or video for a call in progress. The computer is a desktop, laptop, or tablet computer including an input device for receiving some form of user input and an output device for outputting information in an audio and/or visual format. The mobile device is a smartphone, wearable device, or other mobile computing aspect including an input device for receiving some form of user input and an output device for outputting information in an audio and/or visual format. The desk phone, the computer, and the mobile device may generally be considered personal devices configured for use by a single user. The shared device is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, amongst the clients 304 through 310 be sent or received using the desk phone, a softphone running on the computer, a mobile application running on the mobile device, or using the shared device that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for setting at least a portion of a VBG based on dynamic content, such as content of a whiteboard. In some such cases, the conferencing software 314 may include the other software 318.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
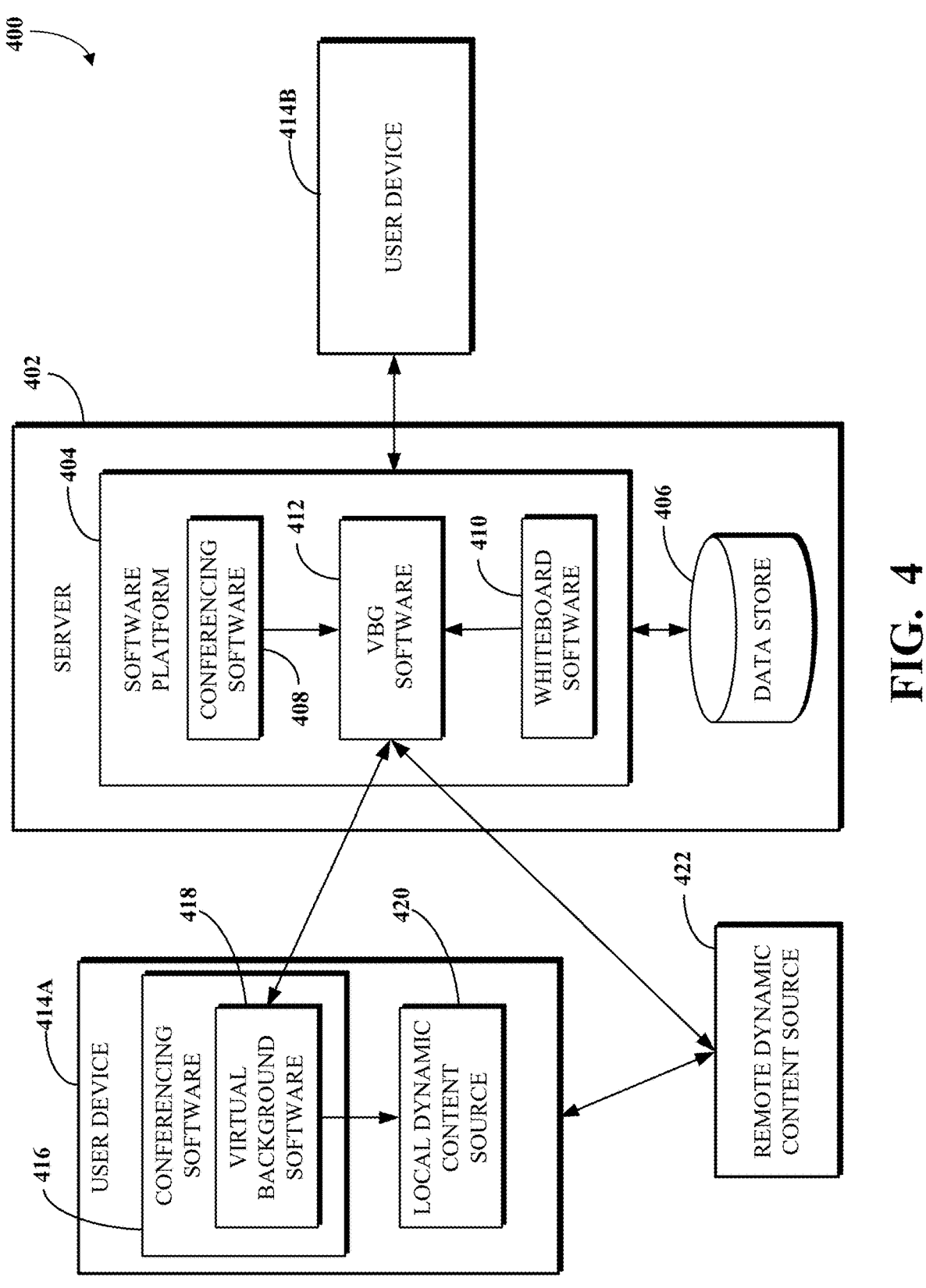
FIG. 4 is a block diagram of an example of a system for setting at least a portion of a target output image based on dynamic content.

FIG. 4 is a block diagram of an example of a system 400 for setting at least a portion of a target output image based on dynamic content. The dynamic content can be obtained from a dynamic content source. The system 400 includes a server 402 that enables users (e.g., conference participants, as users of user devices), inter alia, to participate in (e.g., virtually join) audio-visual conferences, also referred to as conferences. As shown, the server 402 implements or includes some or all of a software platform 404 and a data store 406. The server 402 can be one or more servers implemented by or included in a datacenter, such as the datacenter 106 of FIG. 1. While a single server (i.e., the server 402) is shown, in some cases, multiple servers may be used to implement the software platform 404, for example, by different servers implementing different or redundant functionality or services of the software platform 404.

The software platform 404, via the server 402, provides conferencing services (e.g., capabilities or functionality) via a conferencing software 408 and provides whiteboard services via a whiteboard software 410. The software platform 404 can be or can be part of the software platform 300 of FIG. 3. The conferencing software 408 can be variously implemented in connection with the software platform 404. In some implementations, the conferencing software 408 can be or can be integrated in the conferencing software 314 of FIG. 3. The whiteboard software 410 can be variously implemented in connection with the software platform 404. In some implementations, the whiteboard software 410 can be or can be integrated in the other software 318 of FIG. 3.

The whiteboard software 410 enables a virtual canvas that users of the software platform 404 may be configured (e.g., enabled or permitted) to access. Different permissions may be associated with different users of a whiteboard. To illustrate, and without limitations, some users may be permitted to modify a whiteboard, some users may be permitted to only view the contents of the whiteboard, and some other users may be permitted to only comment on (e.g., add comments to) the whiteboard or contents therein. Modifying (e.g., editing) a whiteboard can include one or more of adding content to the whiteboard, deleting content from the whiteboard, changing content of the whiteboard, or changing the arrangement of content in the whiteboard. Other permissions or combinations thereof are possible.

A user can modify the whiteboard by adding content (e.g., text, shapes, images, animations, or videos) to the whiteboard. The whiteboard software 410 maintains (e.g., stores), such as in the data store 406, locations of edited content or comments added to the whiteboard along with the respective users who added the content or made the comments. The portion of the whiteboard that may be displayed at a device of a participant is referred to as a viewport. The whiteboard software 410 may display or cause to be displayed, at a device of a user, content of a viewport. As used herein, the term "viewport" also refers to a portion of a whiteboard that can be used as a source of dynamic content.

The viewport may correspond to the whiteboard as a whole. That is, the viewport may be configured such that the viewport includes all of the content of the whiteboard. As such, the viewport can be considered to be a non-static viewport. To illustrate, if a user adds or moves content (e.g., an image, a shape, or text) to the left of the left-most content of the whiteboard, then the viewport necessarily changes to include the added or moved content.

The data store 406 can store data related to conferences and data related to users who have participated or may participate in one or more conferences. The data store 406 can be included in or implemented by a database server, such as the database server 110 of FIG. 1. The data store 406 can include data related to scheduled or ongoing conferences and data related to users of the software platform 404. As already mentioned, the data store 406 can store data descriptive of permissions associated with whiteboards and data descriptive of modifications to whiteboards.

The data store 406 can include associations between users and VBG rules (e.g., a VBG rule preference). To illustrate, the data store 406 may store, with respect to a user, a preference indicating that a particular VBG rule is to be used to set the target VBG of the user in all conferences that the user participates in. As another illustration, the data store 406 may store a set of VBG rules that are created by or otherwise associated with the user. In an example, a conference participant can select a VBG rule so that dynamic VBG images are generated for the conference participant according to the VBG rule.

A user device 414A and a user device 414B of respective users are shown as being connected to the server 402. The connections to the server 402 can indicate that at least one of user devices 414A, 414B may be connected to a conference and/or at least one of the user devices 414A, 414B may be connected to a whiteboard. When a user device is connected to a conference, the user associated with the user device is referred to herein as a conference participant. As can be appreciated, many more user devices may simultaneously connect to a conference or to a whiteboard. Similarly, the software platform 404 implemented using the server 402 can enable many conferences to be concurrently active and/or many whiteboards to be concurrently interacted with.

The user devices 414A, 414B can be devices of users who are configured (e.g., enabled) to or otherwise can join a conference. Each of the user devices 414A, 414B may, for example, be one of the clients 304 through 310 of FIG. 3. Alternatively, each of the user devices 414A, 414B may be devices other than a client. Output images obtained (e.g., generated or composed) with respect to the conference participant associated with the user device 414A are transmitted, such as by the server 402, to the user device 414B. A conferencing software (not shown) of the user device 414B can cause the output images to be displayed on a display of the user device 414B. As described above, the output images can be displayed at the user device 414B in a tile associated with the conference participant of the user device 414A. An output image can be a source output image or a dynamic VBG image.

The user device 414A may include a conferencing software 416. The conferencing software 416 can include or work in conjunction with a VBG software 418. The user device 414A is shown as including the conferencing software 416, which includes VBG software 418. In an example, the VBG software 418 may be separate from, but works in conjunction with, the conferencing software 416. The user device 414A can include a camera device (not shown) that can be configured to capture images of the user while the user is in a conference. At least some of the camera images (or output images obtained therefrom) may be transmitted by the user device 414A to the server 402, which may in turn transmit the images to devices of other conference participants, such as the user device 414B. The user device 414A may include a local dynamic content source 420, which is further described below.

In some implementations, the user device 414A may communicate directly with the devices of other participants, such as the user device 414B. The user device 414A can directly communicate with one or more such other devices using peer-to-peer, real-time communications. As such, for example, source or dynamic VBG images obtained at the user device 414A can be received directly at another user device (e.g., the user device 414B), and vice versa.

A VBG software 412 of the software platform 404 obtains, with respect to a conference participant, dynamic content from a dynamic content source. The VBG software 412 sets at least a portion of a background of an image associated with the conference participant based on the dynamic content. The dynamic content can be obtained from the local dynamic content source 420, a remote dynamic content source 422, the whiteboard software 410, or some other dynamic content source. The local dynamic content source 420 is so named (i.e., "local") to indicate that the dynamic content that the local dynamic content source 420 provides is obtained based on content that is displayed on the display of the user device 414A. The remote dynamic content source 422 is so named (i.e., "remote") to indicate that the remote dynamic content source 422 is not associated with (e.g., is not a constituent or software of) the software platform 404 and is not implemented at the user device 414A.

The conference participant of the user device 414A may indicate that a portion of the background of output images is to be populated by the VBG software 412 based on dynamic content. The conference participant may indicate (e.g., provide or identify) the source of the dynamic content. Depending on the dynamic content source or a configuration related thereto, the VBG software 412 may query for (e.g., pull or request) the dynamic content from the dynamic content source or the dynamic content source may push the dynamic content to the VBG software 412. A dynamic content source can be implemented in a variety of ways and can communicate with the VBG software in a variety of ways. To illustrate, and in an example, a dynamic content source (such as the remote dynamic content source 422) may be a public or a private resource (application) that may be accessible via an Application Programming Interface (API).

The server 402 (e.g., the VBG software 412 therein) may receive a source output image of the conference participant. The VBG software 412 may generate (e.g., obtain, assemble, create, or compose) a dynamic VBG image from the source output image based on a VBG rule. The dynamic VBG image may be transmitted for display at devices of other conference participants, which may include the user device 414A itself and the user device 414B. In another example, the server 402 may transmit a VBG rule (i.e., an indication thereof, such as an identifier) to the user device 414A. The VBG software 418 of the user device 414A may use the VBG rule to obtain dynamic content. The VBG software 418 can use the dynamic content to obtain a dynamic VBG image that can be transmitted to other conference participants via the server 402. In another example, the VBG software 412 may use a VBG rule to obtain dynamic content. The VBG software 412 can transmit the dynamic content to the user device 414A. The VBG software 418 of the user device 414A can use the dynamic content to generate a dynamic VBG image that is transmitted for display at devices of conference participants, including the user device 414B and/or the user device 414A.

A dynamic content source provides dynamic content. The dynamic content source may provide the dynamic content in response to a request from a VBG software, which transmits a request to the dynamic content source according to a VBG rule (i.e., according to configurations of the VBG rule). The dynamic content source may push the dynamic content to a VBG software, which may be the VBG software 412 or the VBG software 418. As mentioned, a VBG rule identifies the dynamic content source. The VBG rule may also include a display mode. The VBG software determines how to use the dynamic content based on the display mode. A dynamic content source, such as the remote dynamic content source 422, may be or otherwise refer to a computing device (e.g., a server), such as the computing device 200 of FIG. 2, or an application executing or that is available therein. Where a dynamic content source is or refers to a computing device, the dynamic content source can comprise a computing system, which can include one or more computing devices. Where a dynamic content source instead is or refers to an application, the dynamic content source can be an instance of software running on a computing device. In some implementations, a dynamic content source can be implemented as a single physical unit or as a combination of physical units.

A "tile" as used herein can mean a portion of a user interface presented (e.g., displayed or caused to be displayed) by the conferencing software and that is associated with a conference participant. The tiles associated with different conference participants may have the same or different sizes. In an example, and as further described herein, a conference participant who is speaking may be shown in a tile that is referred to as a main stage. A tile associated with a conference participant may depict a foreground segment and a background segment of the video stream of the conference participant. The background segment can be the background segment of a camera image (i.e., the actual background of conference participant) or a background replacement media item. In another example, conference participants may be arranged in a virtual environment so as to give the impression that the conference participants are physically co-located, such as described herein with respect to immersive views.

The foreground segment depicted within a tile may include a representation of the subject conference participant. A "representation" of a conference participant, as used herein, broadly refers to or includes a representation indicative of the conference participant, such as a portrait, an image, a likeness, a body definition, a contour, or any such representation of the conference participant. In an example, the representation can be a likeness of the conference participant as obtained from a foreground segment of the camera image, as described below.

The representation can be a filtered image of the likeness of the conference participant. To illustrate, the conference participant may indicate to the conferencing software that the face of the conference participant should be replaced or supplemented with other visual data (e.g., a hat or mustache). In another example, the representation may be a virtual character that the conference participant may choose. In yet another example, the representation may simply be a textual string that can be used as an identifier of the conference participant, such as the initials of the conference participant.

A camera image typically includes a likeness (e.g., an image) of the conference participant and other image data. A segmentation software may segment a camera image into a foreground segment that includes at least a substantial portion of the likeness of the user and a background segment that includes at least a substantial portion of the remainder of the camera image. To illustrate, if the user is sitting in front of the camera, the foreground segment may include the portion of the user within a field of view of the camera (e.g., their head and torso) and potentially one or more objects (e.g., a desk, a keyboard, and/or a mouse) that may be within the field of view of the camera; and the background segment may include everything else in the camera image.

The foreground segment or the background segment may include disjointed (e.g., disconnected or otherwise noncontinuous) portions of a camera image. In some configurations, the one or more objects may be considered part of the background segment rather than part of the foreground segment. For simplicity of explanation, the foreground segment is assumed to include the likeness of the user and the background segment is assumed to include the remainder of the image data of the camera image. The foreground segment (or more generally, a representation of the conference participant) may be overlaid on the VBG to obtain an output image. The output image may be transmitted for display on respective display devices of the other participants.

A "source output image" is a camera image or an output image, as described above, of a conference participant the background of which is to be set (or changed), at least in part, based on dynamic content, which may be obtained according to a VBG rule. That is, a camera image the background of which is not modified is referred to herein as a source output image; and a camera image the background of which is changed to a VBG is also referred to herein as a source output image. More generally, any data collectively representing a conference participant and displayed within a tile is also referred to herein as a source output image. As used herein, a "dynamic VBG image" refers to an image that results from setting at least a portion of a source output image using dynamic content. Thus, a main distinguishing difference between a source output image and a dynamic VBG image is that whereas no portion of the source output image is set based on dynamic content, at least one portion of the dynamic VBG image is set based on dynamic content. A "VBG part," as used herein, refers to a portion of a dynamic VBG image that is, includes, or shows dynamic content.

An image transmitted, such as by the VBG software 418 or the VBG software 412 within an image stream, may be a composite image produced by the positioning of a foreground segment on top of a VBG. An image that is captured by a camera of the conference participant is referred to herein as a "camera image," and the image of the conference participant that is transmitted to the other participants for display is referred to herein as an "output image."

Figure 5:
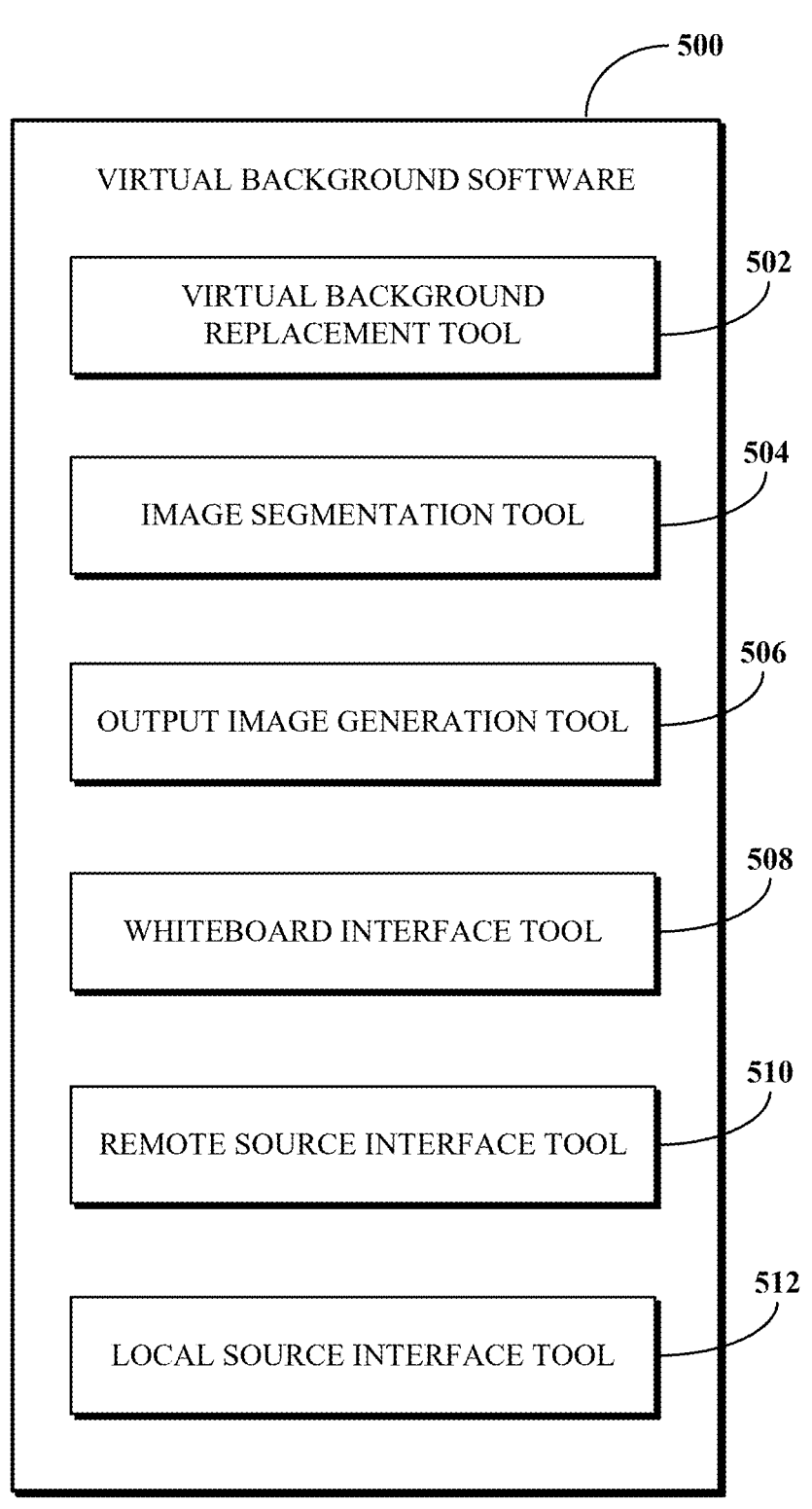
FIG. 5 is a block diagram of example functionality of a VBG software.

FIG. 5 is a block diagram of example functionality of a VBG software 500, which may be, for example, one or more of the VBG software 412 or the VBG software 418 of FIG. 4. The VBG software 500 includes tools, such as programs, subprograms, functions, routines, subroutines, operations, executable instructions, and/or the like for, inter alia and as further described below, setting portions of source output images (e.g., portions of background segments therein) based on dynamic content.

At least some of the tools of the VBG software 500 can be implemented as respective software programs that may be executed by one or more computing devices, such as the computing device 200 of FIG. 2. A software program can include machine-readable instructions that may be stored in a memory such as the memory 204, and that, when executed by a processor, such as processor 202, may cause the computing device to perform the instructions of the software program.

As shown, the VBG software 500 includes a VBG replacement tool 502, an image segmentation tool 504, an output image generation tool 506, a whiteboard interface tool 508, a remote source interface tool 510, and a local source interface tool 512. In some implementations, the VBG software 500 can include more or fewer tools. In some implementations, some of the tools may be combined, some of the tools may be split into more tools, or a combination thereof. A VBG software that is implemented by or is available at a client may not include some of the tools of the VBG software 500. A VBG software that is implemented by or is available at a server may not include some of the tools of the VBG software 500. For example, the local source interface tool 512 may not be available in the VBG software 412 of FIG. 4.

The VBG replacement tool 502 enables a conference participant to select a background replacement media item (i.e., a VBG). The output image generation tool 506 can use the VBG to replace a background segment of camera images based on the VBG.

The VBG replacement tool 502 can also identify a VBG rule for a conference participant. The VBG rule may be identified in any number of ways. In an example, the VBG rule may be identified based on a selection of the VBG rule by the conference participant. The conference participant may select the VBG rule for a particular conference. For example, in the process of joining or at any time during the conference, the conference participant may select the VBG rule. In another example, the conference participant may set a VBG rule preference such that a specific VBG rule is used, by default, when the conference participant joins any conference. In another example, a VBG rule can be set via one or more user interfaces, as described with respect to FIGS. 6A-6F.

A VBG rule may be evaluated (e.g., performed, executed, or parsed) to obtain dynamic content that is then used to set (e.g., select, configure, or determine) a VBG part for the conference participant. Using the VBG part to set dynamic target images may include obtaining a VBG part based on the dynamic content and using the VBG part to generate one or more dynamic VBG images. Evaluating a VBG rule for a conference participant includes receiving (or causing to be received) by the VBG software, or one or more tools therein, the dynamic content and handling (e.g., processing) the received dynamic content according to configurations of the VBG rule.

The image segmentation tool 504 may obtain a segmentation of an image. In an example, the image segmentation tool 504 may be or may include a machine learning model that is trained to obtain segmentations of images. In an example, the image segmentation tool 504 may use a service (e.g., a cloud-based service) to obtain the segmentation. Segmenting an image can include obtaining a foreground segment, a background segment, or both from the image. The image segmentation tool 504 can be used to segment a source output image to obtain a source foreground segment from the source output image. The foreground segment includes a likeness of a conference participant, which the VBG software 500 may replace with another representation. Other image processing techniques can be used by the image segmentation tool 504 to obtain a segmentation of an image.

The image segmentation tool 504, when executing at a user device (such as when the image segmentation tool 504 is part of the VBG software 418 of FIG. 4), may receive a camera image and obtain at least a source foreground segment from the camera image. The output image generation tool 506 may combine the source foreground segment with a VBG (if any) and a VBG part to obtain a dynamic VBG image. The image segmentation tool 504, when executing at a server (such as when the image segmentation tool 504 is part of the VBG software 412 of FIG. 4), may receive a source output image and obtain at least a source foreground segment from the camera image.

The output image generation tool 506 is used to obtain an output image. When a VBG rule is configured by a conference participant, the output image generation tool 506 generates dynamic VBG images; and when a VBG rule is not configured by the conference participant, the output image generation tool 506 generates target output images. The output image generation tool 506 generates (e.g., combines) different aspects of a source output image to obtain the dynamic VBG image (or target output images, as the case may be) for display on devices of conference participants. For example, the output image generation tool 506 may combine any subset of a representation (e.g., a source foreground segment) of a conference participant, a VBG, and dynamic content that is obtained from a dynamic content source into a dynamic VBG image. As further described herein, the output image generation tool 506 may resize (e.g., grow or shrink) the representation from a default size and/or the output image generation tool 506 may place the representation at a location within the dynamic VBG image that is different from a default position. Additionally, the output image generation tool 506 may resize the dynamic content (i.e., the VBG part obtained therefrom) to fit a designated image portion.

The whiteboard interface tool 508 obtains dynamic content from a whiteboard. The whiteboard interface tool 508 interfaces with a whiteboard software, such as the whiteboard software 410 of FIG. 4, to obtain the dynamic content.

Figure 7A:
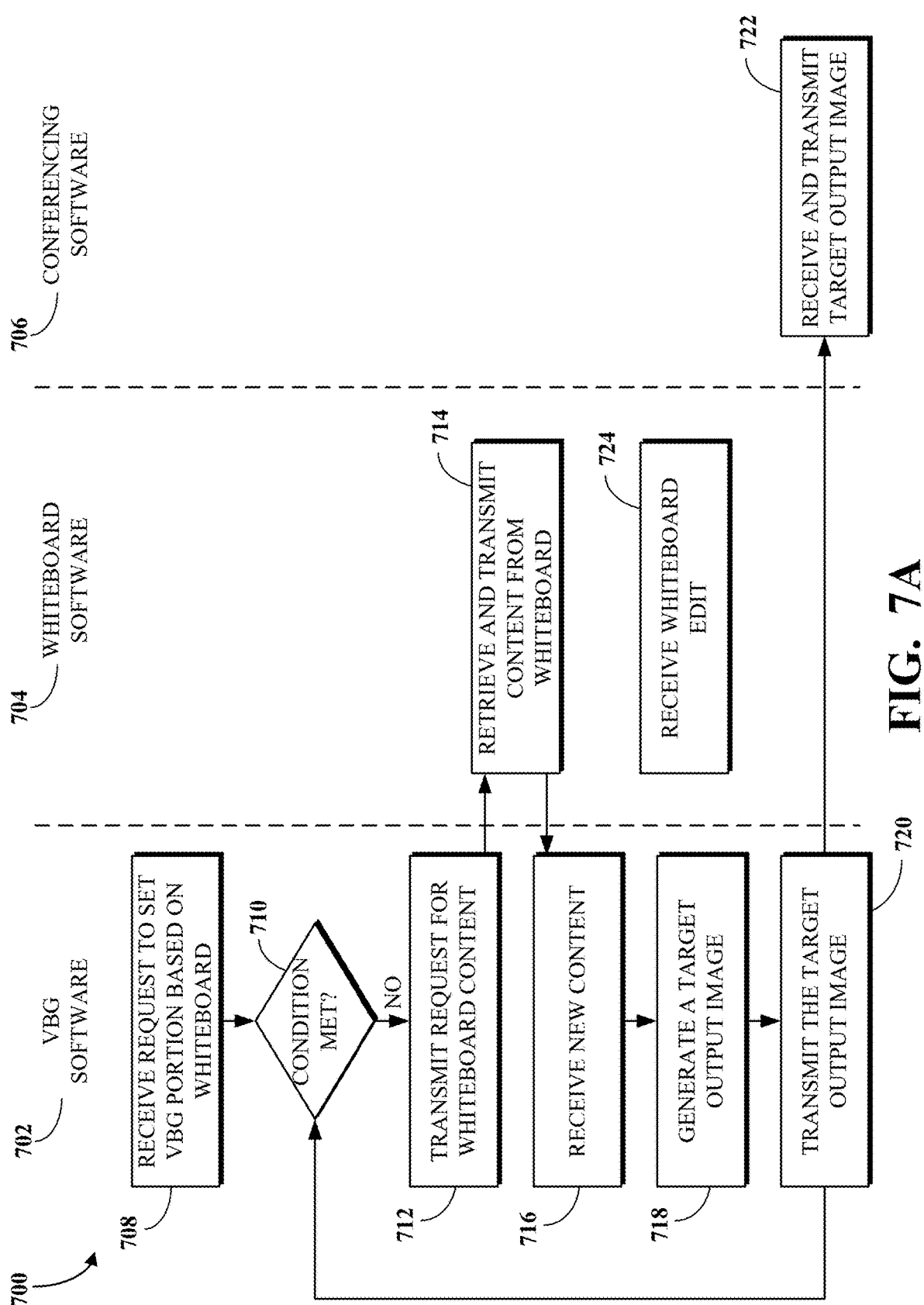
FIG. 7A is an example of an interaction diagram for setting a portion of a VBG based on dynamic content obtained from a whiteboard.

As further described with respect to FIG. 7A, the whiteboard interface tool 508 may request (e.g., query for) the dynamic content from the whiteboard software. To illustrate, using APIs of the whiteboard software, the whiteboard interface tool 508 may transmit a request to the whiteboard software to obtain the dynamic content. The request may include an identifier of the whiteboard and an indication of a portion of the whiteboard (i.e., a viewport into the whiteboard). The request may include a user identifier of the conference participant on whose behalf the whiteboard interface tool 508 is to obtain the dynamic content. The whiteboard software may use the user identifier to determine whether the conference participant has at least a read permission to the whiteboard.

Figure 7B:
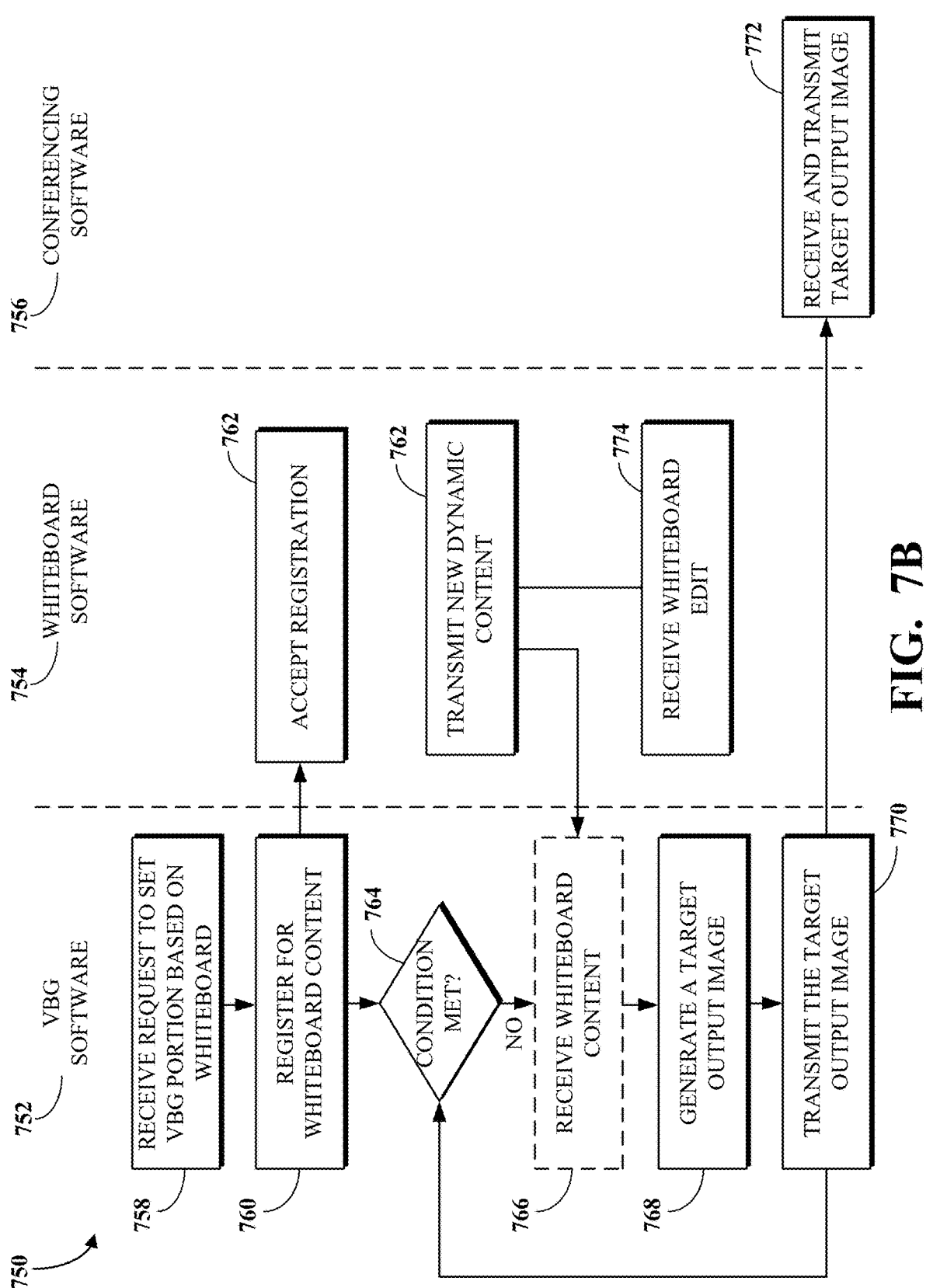
FIG. 7B is an example of an interaction diagram for setting a portion of a VBG based on dynamic content obtained from a whiteboard.

As further described with respect to FIG. 7B, the whiteboard interface tool 508 may register a callback function with the whiteboard software indicating an interest in a portion of a whiteboard. That the whiteboard interface tool 508 registers an interest in the portion of a whiteboard can mean that the whiteboard software is to programmatically notify (via the callback function) the whiteboard interface tool 508 when that portion of the whiteboard changes. In an example, the whiteboard software may include in the callback function data indicative of the changes. In another example, in response to receiving the callback from the whiteboard software, the whiteboard interface tool 508 may transmit a request to the whiteboard software to obtain the dynamic content.

The whiteboard interface tool 508 receives, from the whiteboard software, data which may be or may be transformed by the whiteboard interface tool 508 into the dynamic content (i.e., the VBG part) that is to be used as the portion of the source output image. The dynamic content can be or can be converted to image data that can be combined with other image data to obtain a dynamic VBG image.

The remote source interface tool 510 enables the conference participant to configure or select a VBG rule to set a portion of a source output image of a conference participant based on dynamic content obtained from a remote dynamic content source, such as the remote dynamic content source 422 of FIG. 4.

The local source interface tool 512 can be used to set a portion of a source output image of a user based on screen content displayed at the user device of the user. The screen content may be obtained by the local source interface tool 512 from a local dynamic content source, such as the local dynamic content source 420 of FIG. 4. The local dynamic content source can be an application currently executing at the user device of the user where the application is displaying content on a display of the user device. The local dynamic content source can be a portion of the content displayed on the display of the user where the content may be associated with one or more applications. The local source interface tool 512 can include screen capture capabilities for capturing the dynamic content.

To capture a portion of the content displayed on the display, the local source interface tool 512 can include desktop capture capabilities for capturing (e.g., obtaining a screen shot of) the entire desktop, including the displayed content of all open windows and applications. The local source interface tool 512 can crop the captured content to a bounding box, as illustrated with respect to FIG. 6E. To capture dynamic content associated with an application, the local source interface tool 512 can perform a window capture to capture only the contents of a single window associated with the application.

FIGS. 6A-6F illustrate examples of setting portions of VBGs based on dynamic content from dynamic content sources. FIGS. 6A-6F illustrate examples of operations of the whiteboard interface tool 508 of FIG. 5.

Figure 6A:

FIG. 6A illustrates an example of a user interface 600 of using dynamic content to set dynamic VBG images of conference participants. The user interface 600 can be displayed on a user device of a conference participant. The user interface 600 illustrates a conference that includes four participants. Each of the conference participants can be represented by a respective tile, such as a participant 602A tile, a participant 602B tile, a participant 602C tile, and a participant 602D tile respectively. For brevity and ease of description, statements such as "the <participant X><verb>" should be understood to mean that the "participant represented by the participant X tile <verb>;" and statements such as "the <tool X> of <participant>" should be understood to mean "the <tool X> of a VBG software that is available or executing at a user device of the <participant>."

The participant 602A, the participant 602C, and the participant 602D, have turned on their respective cameras and, as such, respective output images (i.e., representations) of these conference participants are displayed in the corresponding tiles on respective devices of other participants. The participant 602B has not turned on their camera. As such, the corresponding tile of the participant 602B shows an identifier (e.g., PARTICIPANT 2) instead of an image of the participant 602B. As such, the representation of the participant 602B is the textual string "PARTICIPANT 2" displayed in a black-filled oval.

The user interface of the conferencing software may include a main stage 604 and a participant list 606. The indication (e.g., a user interface control, an icon, a label, an output image, or a tile) of the participant currently speaking may be displayed in the main stage 604 and the non-speaking participants may be listed in the participant list 606. While the participant 602D is not listed in the participant list 606, in some implementations the conference participant shown in the main stage 604 may additionally be included in the participant list 606. In some implementations, a user interface of the conferencing software may not include at least one of a main stage or a participant list.

The tile corresponding to each of the conference participants whose camera is turned on includes a foreground segment (such as a foreground segment 608), which in this case is or includes the likeness of the conference participant (e.g., the participant 602D) and a displayed background (such as a background 610), which is an image of a national park. As such, the source output image associated with the participant 602D includes a VBG image. That is, the user interface 600 illustrates that the participant 602D selected, or has selected for them, as their background the image of a national park. However, as can be appreciated, a conference participant may not necessarily have a selected VBG. In such a case, the background 610 would otherwise show the actual background that is in the field of view of the camera capturing the likeness of the participant 602D.

A conference participant may have available commands, such as one or more of the commands 612, that can be used for, or in conjunction with, setting at least a portion of their background based on dynamic content. The commands 612 is shown as including the commands 614-618. However, more or fewer commands may be available. The VBG software 418 of the user device 414A of FIG. 4, or the VBG software 412 of the server 402, may cause the commands 612 to be presented on the device of the conference participant, such as the user device 414A of FIG. 4. The commands 612 may be presented in any number of ways and may be presented using different user control elements (e.g., buttons or menu items). A respective user flow may be associated with each of the commands 612 for an optimal user experience.

The command 614, when invoked by a conference participant (i.e., an invoking conference participant), enables the invoking conference participant to set a portion of their background based on dynamic content from a whiteboard. The command 616, when invoked by a conference participant, enables the invoking conference participant to set a portion of their background based on dynamic content obtained from a remote dynamic content source, such as the remote dynamic content source 422 of FIG. 4. The command 618, when invoked by an invoking conference participant, enables the invoking conference participant to set a portion of their background based on dynamic content from a local dynamic content source (such as content currently displayed at the device of the invoking conference participant). The command 614 is further described primarily with reference to FIGS. 6A-6C; the command 616 is further described primarily with reference to FIG. 6D; and the command 618 is further described primarily with reference to FIG. 6E.

When the command 614 is invoked, the invoking conference participant is able to select an area of their background that is to be replaced by (e.g., populated with) dynamic content from a whiteboard, select the whiteboard, and select additional criteria for composing dynamic VBG images. To illustrate, in response to invoking the command 614, the invoking conference participant is able to draw a bounding box, such as the bounding box 620, indicating the area of their background (or more accurately the area of their source output image) that is to be replaced (e.g., overlaid) by dynamic content from the whiteboard. That is, the bounding box 620 indicates the portion of the VBG of the invoking conference participant that is to be replaced with the dynamic content (i.e., with a VBG part).

While not specifically shown, the invoking conference participant can select the whiteboard from which the dynamic content is to be obtained. In an example, a search or selection user interface (not shown) may be used by the invoking conference participant to select the whiteboard. Via the user interface, the invoking conference participant can select one of the whiteboards that the user has at least read permission to. In an example, the whiteboard interface tool 508 may present the user interface in conjunction with the whiteboard software.

Figure 6B:
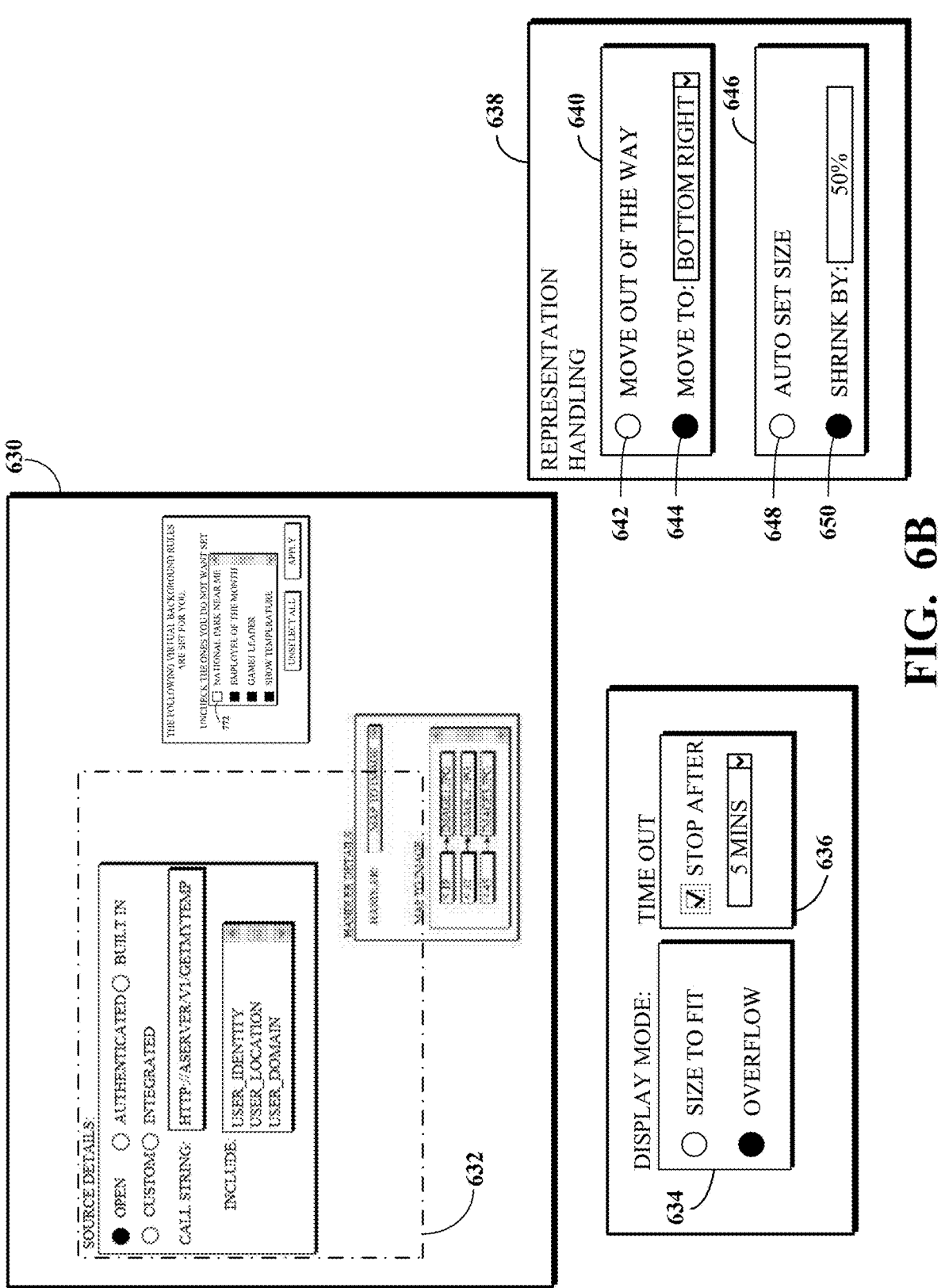

In response to selecting the whiteboard, the whiteboard may be opened, as shown with respect to user interface 630 of FIG. 6B. FIG. 6B illustrates user interfaces that can be used to select or set criteria related to VB rules. On the user interface 630, the invoking conference participant can draw a bounding box 632 around the area (i.e., a viewport) of the whiteboard from which the dynamic content is to be obtained. In an example, the invoking conference participant may indicate that the whiteboard content, as a whole, is to be used.

As can appreciated, the size of the bounding box 620 may be different from the size of a bounding box 632. As such, the invoking conference participant can select a fitting criterion 634 from amongst a SIZE TO FIT and an OVER-FLOW option. The SIZE TO FIT option, when selected, causes the output image generation tool 506 to adjust (e.g., shrink, grow, or stretch) the size of the dynamic content to fit in the area indicated by the bounding box 620. When the OVERFLOW option is selected, the output image generation tool 506 may simply align the top left corners of the area indicated by the bounding box 632 and the dynamic content. The output image generation tool 506 may crop the dynamic content to fit into the bounding box 620 or may allow the dynamic content to fill as much as possible of the bounding box 620.

The invoking conference participant may associate a condition related to setting the portion of the virtual background based on the dynamic content. An example of such a condition is a timeout period. The invoking conference participant can set the timeout period via a user interface 636. As shown, the user interface indicates that the VBG software 500 is to stop replacing the portion of the virtual background based on the dynamic content after 5 minutes.

Via a user interface 638, the invoking conference participant can select representation handling criteria to be used by the output image generation tool 506 when the portion of source output images is being based on the dynamic content.

A location setting criterion 640 can be used to indicate whether the output image generation tool 506 is to automatically determine an optimal placement of the representation (i.e., when an option 642, "MOVE OUT OF WAY," is selected) or to move the representation to a specific location (i.e., when an option 644, "MOVE TO," is selected) in dynamic VBG images. An optimal placement of the representation may be a placement of the representation such that no portion of the representation overlaps the VBG part. The option 644 can include the image locations, "BOTTOM RIGHT," "BOTTOM CENTER," "BOTTOM LEFT," TOP RIGHT," "TOP CENTER," "TOP LEFT," other image locations, or a combination thereof.

A size setting criterion 646 can be used to indicate whether the output image generation tool 506 is to automatically determine an optimal size of the representation (i.e., when an option 648, "AUTO SET SIZE," is selected) or to set the size based on a provided size (i.e., when an option 650, "SHRINK BY," is selected) in dynamic VBG images. An optimal size of the representation may be one such that no portion of the representation overlaps the VBG part.

The criteria selected by the invoking conference participant can be stored in a VBG rule. The VBG rule can be stored in a data store, such as the data store 406 of FIG. 4. The VBG rule can include a location and extent of the portion of the VBG. For example, the VBG software 500 may store in association with the VBG rule a Cartesian location of a top-left pixel of the bounding box 620 and an extent (a width and a height) of the bounding box. The VBG rule can include an identifier of the whiteboard and an indication of the viewport into the whiteboard. The VBG rule can optionally include one or more of the fitting criterion, the timeout period, the location setting criterion 640, and the size setting criterion 646.

Figure 6C:
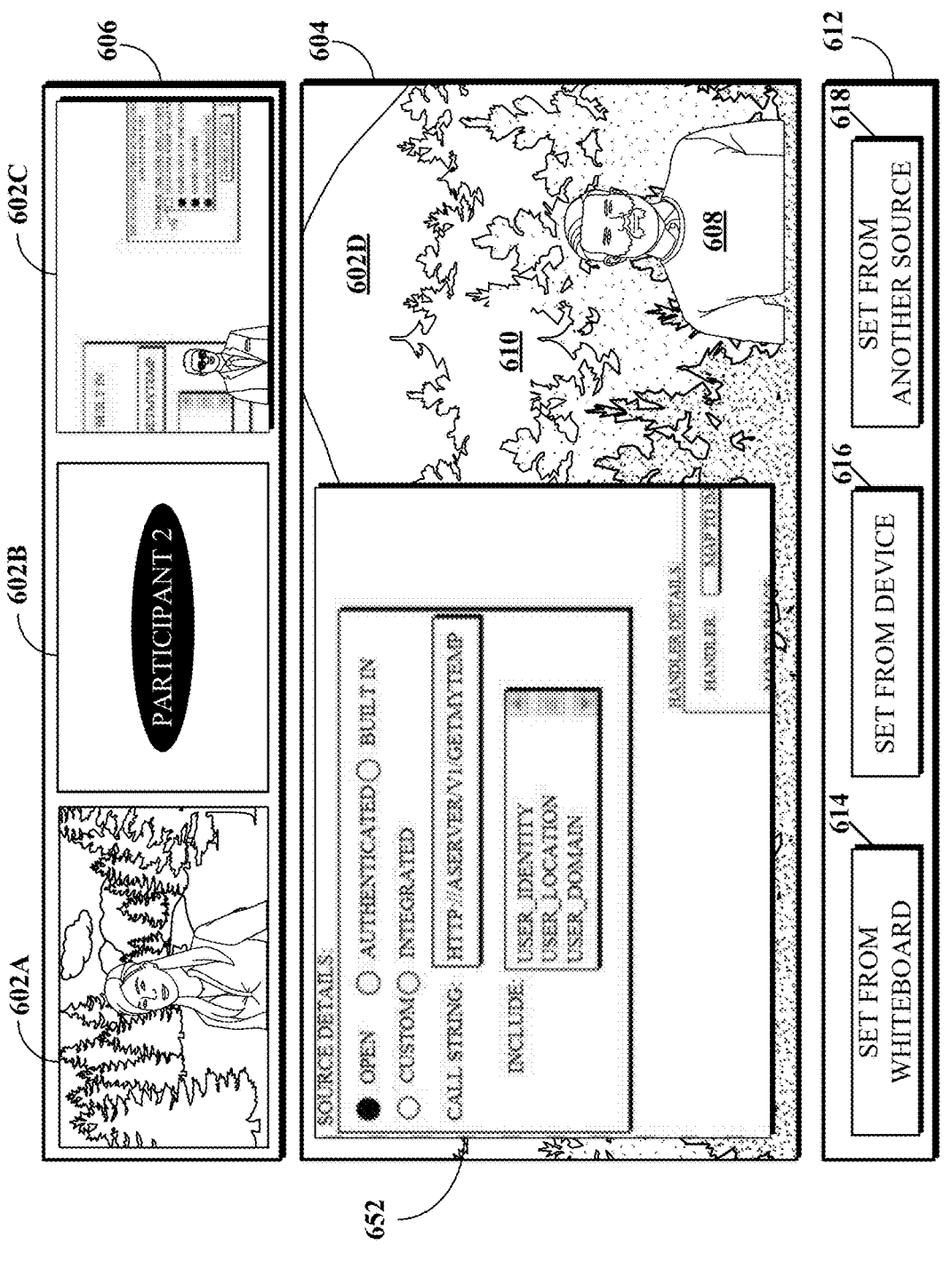

While not specifically shown in FIGS. 6A-6C, in an example, the invoking conference participant can select a previously stored VBG rule to use instead of having to perform steps as described with respect to FIGS. 6A-6C whenever the invoking conference participant desires to set a portion of their VBG based on dynamic content obtained from the same whiteboard and the same viewport and using the same criteria of the stored VBG rule.

FIG. 6C illustrates that the area of the participant 602D tile indicated by the bounding box 620 is now populated by a VBG part 652 obtained from the whiteboard. While not specifically shown, when the content of the viewport (defined by the bounding box 632 of FIG. 6B) changes (such as when modified by the participant 602D or another user having permission to modify the whiteboard), those modifications will be reflected in the VBG part 652. The participant 602D tile now reflects the criteria of the VBG rule. For example, the foreground segment 608 (i.e., the representation of the participant 602D) is shown as being shrunk by 50% and is placed in the bottom right corner of the participant 602D tile. Additionally, the tile of the participant 602C illustrates that the whole of the background of the participant 602C is dynamic content that is obtained from, in this example, the same whiteboard, that their representation is also shrunk by 50% and that the representation is placed in the bottom left corner.

FIG. 6D is an example of a user interface 660 for partly configuring VBG rules. The user interface 660 enables a conference participant to create or edit a VBG rule for setting a portion of a VBG based on dynamic content obtained from a remote dynamic content source, such as the remote dynamic content source 422 of FIG. 4. The user interface 600 may be presented to the user in response to the user invoking the command 616 of FIG. 6A. As already described above, a VBG software can use the configurations of a VBG rule to evaluate the VBG rule.

FIG. 6D is used to illustrate some configuration options of VBG rules as well as the effects (operations) of such configuration options when a VBG rule is being evaluated by the VBG software. Additional criteria of a VBG rule (such as a location and extent of bounding box) are not illustrated in the user interface 660. The VBG software evaluates a VBG rule configured via the user interface 660 or as described elsewhere in response to the VBG rule being identified for or by a conference participant. The VBG rule may be identified in response to the conference participant selecting the VBG rule, or any other way of identifying the VBG rule for the conference participant.

A VBG name field 662 allows the user to provide a name for the VBG rule being configured. In this case, the rule name is being set to "SHOW SCORE." The user may provide a rule type via rule type options 664. The rule type indicates to the VBG software how the dynamic content are obtained from the dynamic content source. The VBG rule may be of a RECEIVE type, a GET type, or some other type (not shown).

In the case of the RECEIVE type, the VBG software receives the dynamic content without making an explicit request to the dynamic content source. In an example, the VBG software may transmit an initial request to the dynamic content source indicating that the dynamic content source is to transmit dynamic content to the VBG software. That is, the initial request is intended to register an interest of the VBG software in receiving dynamic content from the dynamic content source. The dynamic content source may transmit the dynamic content according to programming (e.g., logic) of the dynamic content source that determines when dynamic content are to be transmitted to the VBG software. The initial request may include a callback function (e.g., a name therefor).

The callback function of the VBG software may receive dynamic content from the dynamic content source. That is, the dynamic content source transmits a request (e.g., a call) to or via the callback function when a dynamic content is to be transmitted from the dynamic content source to the VBG software. In an example, the user may provide a name of an API (i.e., the callback function) in the user interface 660. The callback function may be transmitted in the initial request. The user may indicate the characteristics (of a conference participant) required by the API and that the VBG software transmits to the dynamic content source when the VBG rule is evaluated. In another example, the API to use for indicating the interest may be well known. As such, the user may not need to provide the API. The user may provide configurations of the dynamic content source via dynamic content source configurations 668.

In the case of the GET type, the user provides configurations of the dynamic content source via the dynamic content source configurations 668. When evaluating the VBG rule, the dynamic content source transmits a request to the dynamic content source according to the configurations and receives the dynamic content from the dynamic content source.

The VBG rule may be configured to have a frequency parameter, which is configured via a field 666. In the case of the GET type, the VBG software transmits requests to the dynamic content source at the configured frequency parameter. In the case of the RECEIVE type, the VBG software may transmit a request to the dynamic content source indicating a desired frequency of receiving dynamic content. The VBG software uses dynamic content received from the dynamic content source to generate dynamic VBG images.

In a dynamic content source configurations 668 section, the user can provide configurations of the dynamic content source. The dynamic content source can be a system, a tool, a software, a program, a subprogram, a function, a routine, a subroutine, an operation, executable instructions, and/or the like from which the dynamic content can be received. Via a type selector 670, the user can select a dynamic content source type. The dynamic content source type can be used by the VBG software to select an optimal technique for communicating with the dynamic content source, select the interaction workflow with the dynamic content source, and infer what data (such as information regarding the conference participant) may be available to the dynamic content source. The user interface 660 illustrates that the dynamic content source type can be one of OPEN, AUTHENTI-CATED, CUSTOM, or BUILT IN. However, other dynamic content source types are possible.

The dynamic content source type of OPEN indicates that the dynamic content source does not require user credentials (e.g., authentication). In the call request field 672, the user can provide a request string that the VBG software can use to obtain dynamic content from the source string. The user interface 660 illustrates that the call string in this case is a REpresentational State Transfer (REST) request. However, this disclosure is not so limited and other ways of submitting requests to the dynamic content source are possible.

The dynamic content source type AUTHENTICATED indicates that the dynamic content source requires user credentials in order to respond to the request call provided in the call request field 672. At the time of evaluating the VBG rule, the VBG software can obtain the credentials from the target conference participant for whom the VBG rule is being evaluated. In an example, the target conference participant may direct the VBG software to store the credentials for later use with the VBG rule. In another example, the dynamic content source may not necessarily require the specific credentials of a target conference participant. As such, the VBG rule may be configured to use the credentials of another user who may be privileged, within the dynamic content source, to access or obtain the dynamic content from the dynamic content source.

The dynamic content source type of BUILT IN indicates that the user is selecting a dynamic content source that is implemented or provided by the VBG software itself. In response to the user selecting the BUILT IN dynamic content source type, the call request field 672 may display a list of available dynamic content sources provided by the VBG software and from which the user can select the desired built-in dynamic content source. Depending on the implementation of a built-in dynamic content source, the user interface 660 may display additional fields that the user can use to provide additional data that the VBG software can use when calling the built-in dynamic content source. Examples of BUILT IN dynamic content sources may be a polling application and a whiteboard software, such as the whiteboard software 410 of FIG. 4. A BUILT IN dynamic content source type may also require authentication, which may be configured as described with respect to a dynamic content source of type AUTHENTICATED.

The dynamic content source type of CUSTOM indicates that the dynamic content source may be an application that may be specifically built to provide dynamic content to the VBG software. The call request field 672 may display fields that enable the user to provide, for example, a script that the VBG software can use to communicate with and receive dynamic content from the dynamic content source. The script may be provided in a programming or scripting language that is supported by the VBG software. The user may type the script in the call request field 672 or may provide (e.g., upload) a file that includes the script. The VBG software may validate the script (such as for syntax errors) prior to saving the script in association with the VBG rule. In an example, the VBG software 500 may store a compiled version of the script for use during VBG rule evaluation. In another example, the script may be compiled on demand at the time that the VBG rule is evaluated.

The dynamic content source type of INTEGRATED indicates that the dynamic content source is such that it is developed using or includes a library (such as a Software Development Kit (SDK)) of the VBG software or a software platform that includes the VBG software. As such, the dynamic content source may have, be allowed, or be granted access to at least some conference participant data regarding (e.g., related to or associated with) a target conference participant who may be using the dynamic content source. Such conference participant data may be stored in a database, such as the data store 406 of FIG. 4. The dynamic content source may use APIs of the SDK to obtain such conference participant data from the VBG software.

In a call request field 672, the user can provide calling data that the VBG software uses to communicate with the dynamic content source at a time of evaluating the VBG rule. The calling data can be or include parameters, settings, configurations, tokens (such as JavaScript Object Notation (JSON) Web Tokens (JWT)), access tokens (as may be required for an OAuth-based application), or other calling data. The call request field 672 may be presented differently depending on the selected dynamic content source type. That is, the call request field 672 may be presented (displayed) using different fields and controls to enable the user to enter the calling data necessary for the VBG software to communicate with the dynamic content source based on the dynamic content source type.

The call string may include characteristic placeholders that the VBG software replaces with actual characteristics (e.g., characteristic values) of the conference participant at the time that the VBG rule is evaluated. The user can select characteristic placeholders to add to the call request field 672 from an available characteristic placeholder list 674.

At least some of the characteristics placeholders may be provided by (e.g., known to) the VBG software. As illustrated in the user interface 660, the characteristics placeholders provided by the VBG software may include USER_IDENTITY, USER_LOCATION (i.e., a characteristic 676), and USER_DOMAIN. These characteristic placeholders are for mere illustration and this disclosure is not limited to or by these illustrative characteristic placeholders.

USER_IDENTITY may be resolved (when the VBG rule is evaluated) to an identifier of the target conference participant, which may be obtained from the conference participant at the time that the conference participant joined a conference. USER_LOCATION may be resolved to a geographic location (e.g., a zip code, a city, a state, or a country) of the target conference participant and may be obtained from profile data of the conference participant. The VBG software may resolve the USER_DOMAIN characteristic placeholder from an email address associated with the conference participant.

As shown in the user interface 660, the call string does not explicitly include characteristic placeholders. This is so because it may be known to the user that the called API (i.e., GETSCORES) includes the IP address of the device of the conference participant in the HTTP request and which the API GETSCORES uses to determine the scores of any regional teams playing matches at the time that the VBG rule is being evaluated. On the other hand, if the VBG rule were to be evaluated at a server, such as the server 402 of FIG. 4, then the location of the server may be different from that of the device of the conference participant. As such, the location of the target conference participant may be explicitly included in the VBG request. If the user were to add the characteristic 676 to the call request field 672, then the call request may become HTTP://ASERVER/VI/GETSCORES/ [USER_LOCATION]. When the VBG rule is evaluated, the VBG software replaces the characteristic placeholder with an actual value of the USER_LOCATION. To illustrate, when the rule is evaluated, the VBG software makes the VBG request HTTP://ASERVER/VI/GETSCORES/48314 to the dynamic content source (i.e., ASERVER).

A VBG rule can also include one or more of a fitting criterion, a timeout period, a location setting criterion, or a size setting, which can be configured as described with respect to the fitting criterion 634, the user interface 636, the location setting criterion 640, and the size setting criterion 646, respectively, and described above with respect to FIG. 6B.

Figure 6E:
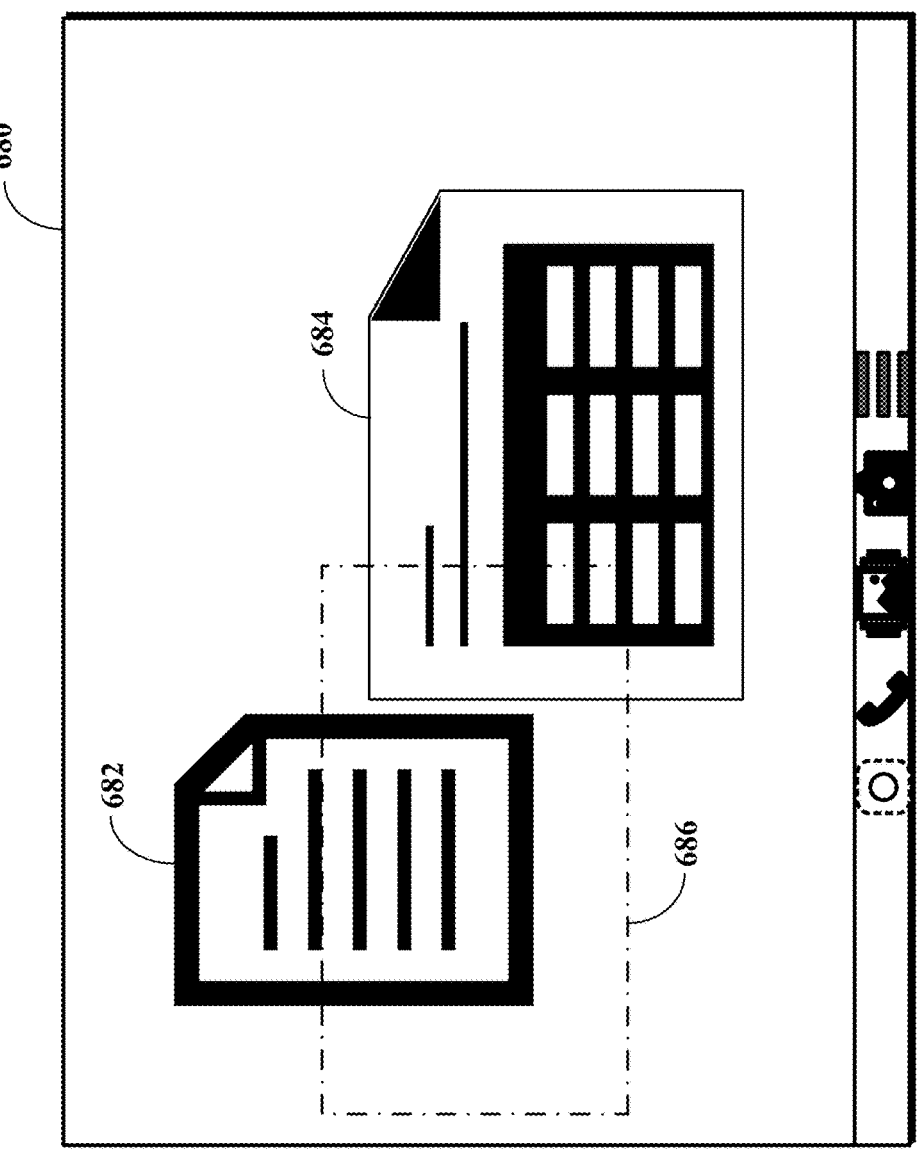

FIG. 6E is an example of a user interface 680 that illustrates using a local dynamic content source. The user interface 680 may be presented to a conference participant in response to the conference participant invoking the command 618 of FIG. 6A. In one possible user interface workflow, the user may invoke the command 618 and is then guided by the local source interface tool 512 of FIG. 5 to select the bounding box 620 of FIG. 6A. Subsequent to selecting the bounding box 620, the conference participant can select a window associated with an application executing at the user device of the user or can select a portion of the display of the user device. FIG. 6E illustrates that two windows (i.e., windows 682 and 684) associated with two respective applications are displayed on the display of the user device. FIG. 6E further illustrates that the user drew (such as using a pointer device or a mouse) a bounding box 686 around the screen content that is to be used by the remote source interface for setting a portion of the VBG of the user. Accordingly, the local source interface tool regularly captures the screen content corresponding to the bounding box 686 and generates dynamic VBG images that include the screen content in the VBG part 652 of FIG. 6C.

Figure 6F:
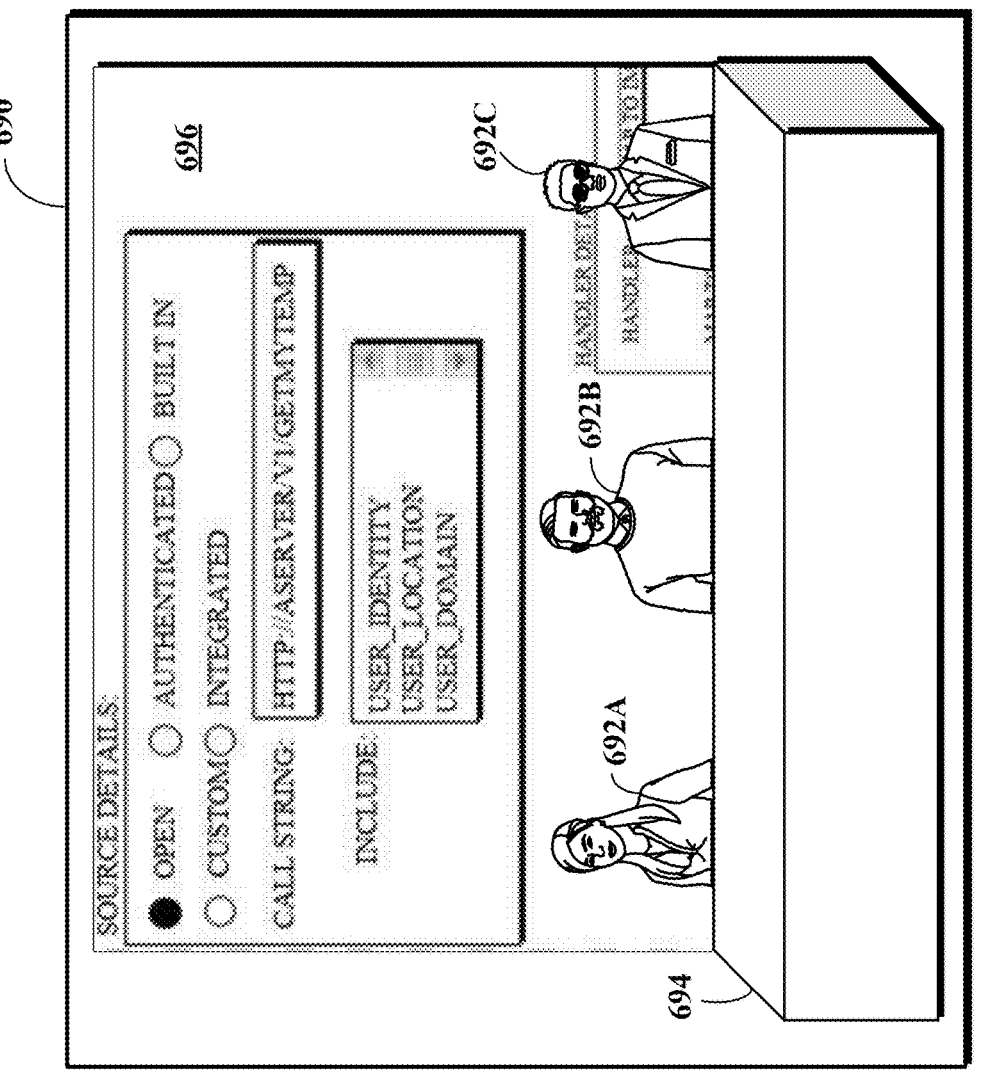

FIG. 6F illustrates an example of using whiteboard content in an immersive view 690 of conference participants. In an immersive view, conference participants can be displayed in a virtual environment so as to give the appearance that the conference participants share a location (i.e., are physically co-located). The virtual environment can be a classroom, a lecture hall, a meeting room, or some other virtual environment.

A conference participant may select a VBG that depicts the virtual environment (e.g., a classroom, lecture hall, café, meeting room, etc.). The VBG may include one or more preset user positions where the conference participants may be displayed. In an example, the preset user positions may be depicted as seats in the virtual environment. The representations of the conference participants can be overlaid over a background of the virtual environment at the preset locations. As mentioned above, the representations can be obtained from foreground segments of camera images. The immersive view can be displayed at the display of at least one of the conference participants.

The immersive view 690 illustrates that three conference participants (e.g., conference participants 692A,-692B, and 692C) are positioned behind a conference room table 694. The immersive view 690 also illustrates that at least a portion (in this case substantially all) of a background 696 of the immersive view displays dynamic content that is based on a whiteboard. Specifically, the background 696 shows is a VBG part that corresponds to the content of the viewport corresponding to the bounding box 632 of FIG. 6B. While not specifically shown, the initial selected VBG of the immersive view 690 may have been an image of a conference room that included a plant in a corner and a chalkboard and a clock hanging on a wall. However, in FIG. 6F, such selected VBG has been overlaid, by a VBG software, with the content of the viewport corresponding to the bounding box 632 of FIG. 6B.

While some user interface controls, fields, configurations, and interactions are described with respect to FIGS. 6A-6F, the disclosure herein is in no way limited to or by such controls, fields, configurations, or interactions. Other controls, fields, configurations, and interactions are possible.

FIG. 7A is an example of an interaction diagram 700 for setting a portion of a VBG based on dynamic content obtained from a whiteboard. The interaction diagram 700 includes a VBG software 702, a whiteboard software 704, and a conferencing software 706. The whiteboard software 704 can be the whiteboard software 410 of FIG. 4. The conferencing software 706 can be the conferencing software 408 of FIG. 4. The VBG software 702 can be the VBG software 418, the VBG software 412, or the VBG software 500 of FIG. 5.

The interaction diagram 700 illustrates that the conferencing software 706 is hosting a conference which includes conference participants connected to the conference using respective devices (not shown). The interaction diagram 700 is described with reference to one conference participant. The user device of the conference participant can include a camera that can be used to obtain camera images for use by the VBG software 702.

At 708, a request to set a VBG portion based on a whiteboard is received by the VBG software 702. In an example, the request may be received in response to the conference participant invoking a command, such as the command 614 of FIG. 6A. As described above with respect to FIGS. 6A-6B, the VBG software 702 may present one or more user interfaces to the conference participant so that the conference participant can select a whiteboard, a viewport (which may be the whiteboard as a whole), an indication of the portion of the VBG, and other criteria as described above. In another example, the request can be received in response to the conference participant selecting a previously stored VBG rule.

At 710, the VBG software 702 determines whether a condition related to setting the portion of the virtual background based on the dynamic content is met. In an example, the condition may be whether a timeout period has lapsed. In an example, the condition may be whether the conference participant has not left the conference. If the condition is met (not shown), then the technique described with respect to the interaction diagram 700 is terminated (not shown). If the condition is not met, then the VBG software 702 proceeds to 712. In other examples, and depending on the semantics of the condition, the VBG software 702 may proceed to 712 if the condition is met.

At 712, the VBG software 702 transmits a request to the whiteboard software 704 for whiteboard content, which may be a request for content of the viewport. In response to the request, the whiteboard software 704 retrieves the content (such as by accessing the whiteboard data stored in the data store 406 of FIG. 4) and transmits the content to the VBG software 702. In an example, the whiteboard software 704 may transform the content to image data (i.e., a VBG part) and transmits the image data to the VBG software 702. In another example, the VBG software 702 may transform any received content into the image data.

At 718, the VBG software 702 (or a tool therein, such as the output image generation tool 506 of FIG. 5) generates a dynamic VBG image. At 720, the VBG software 702 transmits (e.g., hands off) the dynamic VBG image to the conferencing software 706. At 722, the conferencing software 706 received and in turn transmits the dynamic VBG image to devices of conference participants. From 720, the VBG software 702 returns (e.g., iterates back) to 710. The interaction diagram 700 also illustrates that, at 724, the whiteboard software 704 can receive edits to the whiteboard. Such edits would be transmitted, at 714, to the VBG software 702 in one of the iterations.

As a person skilled in the art appreciates, implementations different from that described with respect to FIG. 7A are possible. For example, instead of transmitting the request at 712 and receiving new content at 716 in every iteration, the VBG software may transmit the request for whiteboard content to the whiteboard software 704 according to a schedule. The schedule can be time based or iteration based.

For example, the schedule can be every $n^{th}$ iteration, where n is an integer that is greater than 1. For example, the schedule can be every predefined number of seconds, such as 1, 2, 5, or 10 seconds. If whiteboard content is not obtained in an iteration, then the most recently obtained whiteboard content can be used at 718 to generate a dynamic VBG image.

FIG. 7B is an example of an interaction diagram 750 for setting a portion of a VBG based on dynamic content obtained from a whiteboard. The interaction diagram 700 includes a VBG software 752, a whiteboard software 754, and a conferencing software 756, which can be or can be similar to the VBG software 702, the whiteboard software 704, and the conferencing software 706 of FIG. 7A, respectively. The interaction diagram 750 is distinguished from the interaction diagram 700 of FIG. 7A in that whereas the VBG software 702 of the interaction diagram 700 queries for whiteboard content, the VBG software 752 registers with the whiteboard software 754 to receive whiteboard content. The interaction diagram 750 includes steps 758, 768, 770, and 772 that can be similar to the steps 708, 718, 720, and 722 of FIG. 7A, respectively, and descriptions therefor are omitted for brevity.

At 760, the VBG software 752 registers with the whiteboard software 754 for whiteboard content. That is, the VBG software 752 transmits a request to the whiteboard software 754 indicating that the whiteboard software 754 is to transmit to the VBG software 752 notifications of changes to the whiteboard. The request can include an indication of the whiteboard and an indication of the viewport. As such, if edits to the whiteboard result in edits (i.e. modifications or changes) to the any portion of the viewport, then the whiteboard software 754 may transmit the contents of viewport to the VBG software 752. For example, at 774, the whiteboard software 754 may receive an edit to the whiteboard that modifies the contents of the viewport. In response to the edit, at 762, the whiteboard software 754 transmits new dynamic content to the VBG software 752, which the VBG software 752 receives at 766.

As described above with respect to FIG. 7A, the new dynamic content can be in the form of image data that the VBG software 752 can use at 768 to generate dynamic VBG images. Several ways are available for the whiteboard software 754 to transmit the new dynamic content to the VBG software 752. In an example, the VBG software 752 may register a callback function with the whiteboard software 754 that the whiteboard software 754 can use at 762 to transmit the new dynamic content.

The step 764 can be similar to the 710 of FIG. 7A. In an example, if the condition is met (such as if a timeout period has lapsed), then the VBG software 752 may transmit (not shown) a request to de-register from the whiteboard content. In response to the VBG software 752 de-registering, the whiteboard software 754 no longer transmits, at 762, new dynamic content to the VBG software 752.

Several variations on the interactions diagrams 700 and 750 are possible. In one example, the VBG software may be implemented or executed at a server, such as the server 402 of FIG. 4. The VBG software may receive source output images from user devices and may receive dynamic content from the whiteboard software. The VBG software may segment a source output image into a foreground segment and a background segment. The VBG software then generates a dynamic VBG image using the foreground segment, the background segment, and dynamic content as indicated by a VBG rule. In another example, a VBG software implemented or executing at a server may receive dynamic content from a whiteboard software and may transmit the dynamic content to a VBG software that is implemented or executing at a user device and that uses the dynamic content to generate dynamic VBG images. In yet another example, a VBG software implemented or executing at a user device may receive a camera image, extract a foreground segment from the camera image, and transmit the foreground segment to a VBG software implemented or executing at a server, which in turn receives dynamic content and generates dynamic VBG images. Other variations are possible.

To further describe some implementations in greater detail, reference is next made to examples of techniques which may be performed for setting a VBG based on dynamic content. FIG. 8 is a flowchart of an example of a technique 800 for setting a portion of a VBG based on dynamic content from a whiteboard (i.e., a virtual whiteboard). The technique 800 can be executed using computing devices, such as the systems, hardware, and software described with respect to FIGS. 1-7B. The technique 800 can be performed, for example, by executing a machine-readable program or other computer-executable instructions, such as routines, instructions, programs, or other code. The steps, or operations, of the technique 800 or another technique, method, process, or algorithm described in connection with the implementations disclosed herein can be implemented directly in hardware, firmware, software executed by hardware, circuitry, or a combination thereof.

At 802, a request to set a portion of a virtual background associated with a conference participant based on a virtual whiteboard is received. The request can be received at a conferencing software from a device of the conference participant. The user device can be the user device 414A of FIG. 4. The request can be received by the VBG software 418 or the VBG software 412 of FIG. 4. In an example, the request can include an indication of the portion of the virtual background. The indication of the portion of the virtual background can be or include a top-left pixel location and an extent. The indication of the portion of the virtual background can be obtained as described with respect to the bounding box 620 of FIG. 6A. In an example, the request can include a viewport (i.e., an indication or a description thereof) into the virtual whiteboard to use as the portion of the virtual background. The viewport can obtained as described with respect to the bounding box 632 of FIG. 6B. As such, the viewport can be the contents defined by the bounding box 632. In an example, the viewport can be the whiteboard as a whole.

At 804, an edit is received (e.g., identified, determined, or detected) to the virtual background. At 806, an image (i.e., a dynamic output image) associated with the conference participant that includes a representation of the conference participant and the edit to the virtual whiteboard is generated. The image can be generated by an output image generation tool, such as the output image generation tool 506 of FIG. 5. An example of the image is shown inside the main stage 604 and the participant 602C tile of FIG. 6C. At 808, the image is transmitted for display at a device of another conference participant within a tile that is associated with the conferencing software and the conference participant.

The edit to the whiteboard can be received from a whiteboard software that is separate from the conference software. For example, the virtual whiteboard can be displayed by a whiteboard software that is separate from the conferencing software and the edit can be received via the whiteboard software. In an example, the conferencing software may enable the conference participant to provide options for adjusting at least one of a placement or a size of the representation in the image. The options for adjusting at least one of a placement or a size of the representation in relation to the at least the portion of the virtual whiteboard in the image. The options for adjusting at least one of a placement or a size of the representation can be in relation to the at least the portion of the virtual whiteboard in the image. As such, the request can include a criterion relating to at least one of a placement or a size of the representation in the image.

A timeout period associated with setting the portion of the virtual background based on the virtual whiteboard may be received from the device of the conference participant. In an example, the technique 800 stops setting the portion of the virtual background based on the virtual whiteboard after a lapse of a timeout period.

The image can be based on an immersive view that includes the respective representations of more than conference participants. In an example, the whole of the background of the image can be based on the whiteboard. In an example, the portion of the virtual background is coextensive with the whole of the virtual background.

Figure 9:
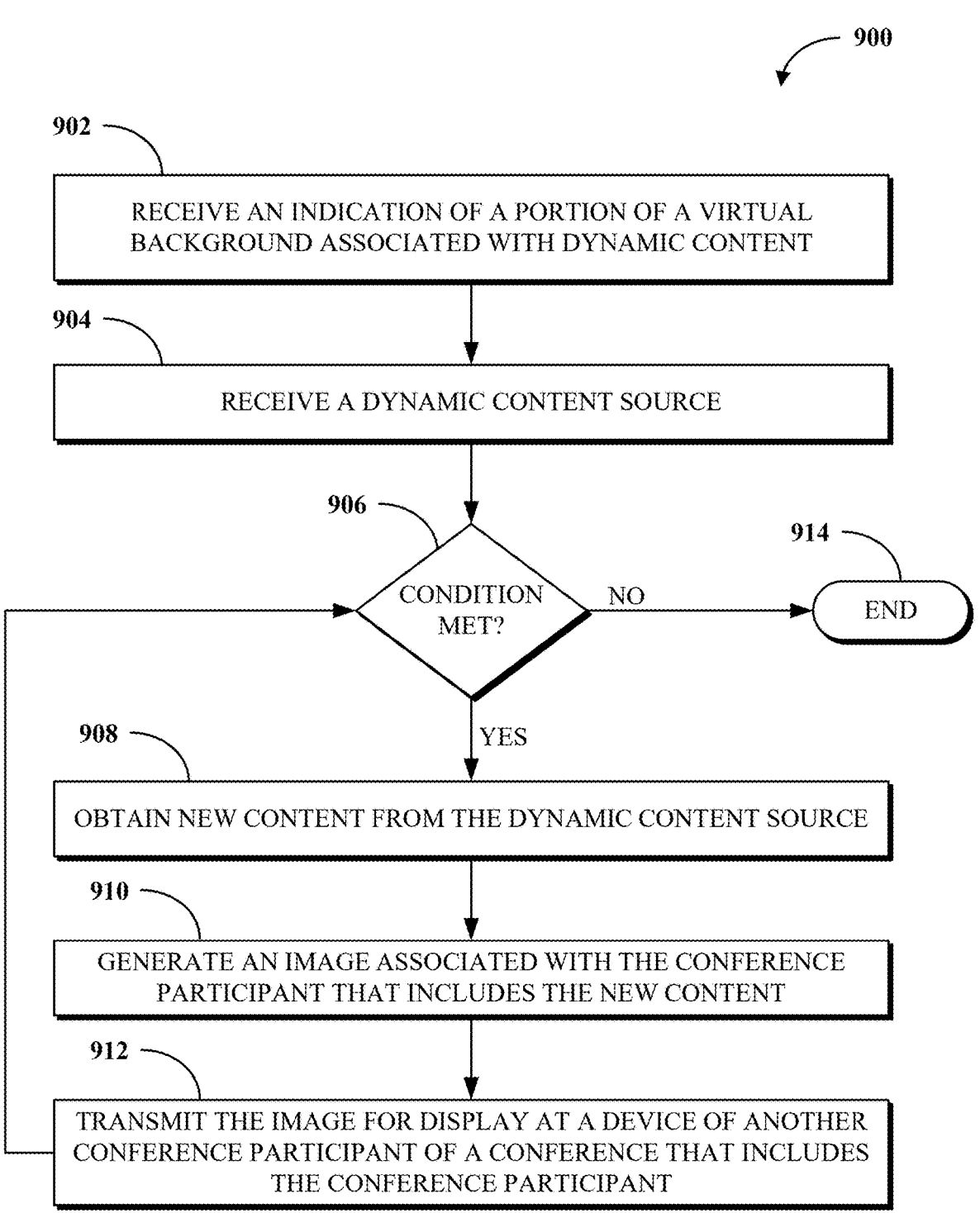
FIG. 9 is a flowchart of an example of a technique for setting a portion of a VBG based on dynamic content from a dynamic content source.

FIG. 9 is a flowchart of an example of a technique 900 for setting a portion of a VBG based on dynamic content from a dynamic content source. The technique 900 can be executed using computing devices, such as the systems, hardware, and software described with respect to FIGS. 1-7B. The technique 900 can be performed, for example, by executing a machine-readable program or other computer-executable instructions, such as routines, instructions, programs, or other code. The steps, or operations, of the technique 900 or another technique, method, process, or algorithm described in connection with the implementations disclosed herein can be implemented directly in hardware, firmware, software executed by hardware, circuitry, or a combination thereof.

At 902, an indication of a portion of a virtual background associated with dynamic content is received from a conference participant. More specifically, the indication is received from a device of a conference participant. The indication of the portion of the virtual background can be as described with respect to the bounding box 620 of FIG. 6A. The indication of the portion of the virtual background can be or include a top-left pixel location and an extent. In an example, the portion of the virtual background is co-extensive with the virtual background.

At 904, a dynamic content source is received from the conference participant. In an example, the dynamic content source can be a whiteboard software. In an example, the dynamic content can be content displayed at the device of conference participant.

At 906, it is determined whether a condition that relates to setting the portion of the virtual background based on the dynamic content is met. In an example, the condition can be or include that the device of the conference participant has not disconnected from the conference. In an example, the condition can be or include that an indication to stop including the dynamic content in the portion of the virtual background has not been received from the conference participant. To illustrate, via a user interface command, which may be included in the commands 612 of FIG. 6A, the conference participant can transmit a request, such as to the VBG software, to stop generating dynamic output images. In an example, the condition can be or include that a time (i.e., a timeout period, as described above) associated with displaying the dynamic content in the portion of the virtual background has not expired. If the condition is not met, the technique 900 ends at 914. If the condition is met, the technique 900 proceeds to 908. The technique 900 performs the steps 908-912 while the condition is met.

At 908, new content is obtained from the dynamic content source. The new content can be obtained as described above. In an example, the new content can be obtained as described with respect to FIG. 7A. In an example, the new content can obtained as described with respect to FIG. 7B. In an example, the new content can be obtained as described with respect to FIG. 6E. In an example, the new content can be obtained according to criteria of a VBG rule. As such, in an example, the dynamic content source can be queried (e.g., polled) for the new content. In another example, the new content can be received via a push of the new content from the dynamic content source.

At 910, an image (i.e. a dynamic output image) associated with the conference participant that includes the new content is generated. The image can be generated as described by the output image generation tool 506 of FIG. 5. As such, the new content is placed within the portion of the virtual background. At 912, the image is transmitted for display at a device of another conference participant of a conference that includes the conference participant. From 910, the technique 900 proceeds back to 906.

For simplicity of explanation, the techniques 800 and 900 of FIGS. 8 and 9, respectively, are depicted and described herein as respective series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method. The method includes receiving, from a conference participant, an indication of a portion of a virtual background associated with dynamic content. The method also includes receiving, from the conference participant, a dynamic content source. The method also includes, while a condition related to setting the portion of the virtual background based on the dynamic content is met, performing steps that include obtaining new content from the dynamic content source, generating an image associated with the conference participant that includes the new content within the portion of the virtual background, and transmitting the image for display at a device of another conference participant of a conference that includes the conference participant. Other embodiments of this aspect include corresponding computer systems, apparatus, and computer programs recorded on one or more computer storage devices, each configured to perform the actions of the methods.

Implementations may include one or more of the following features. The method where the dynamic content source can be a whiteboard software. Obtaining the new content from the dynamic content source may include querying the dynamic content source for the new content. Obtaining the new content from the dynamic content source may include receiving the new content via a push of the new content from the dynamic content source. The condition related to setting the portion of the virtual background based on the dynamic content is met may include that a device of the conference participant has not disconnected from the conference. The condition related to setting the portion of the virtual background based on the dynamic content is met may include that an indication to stop including the dynamic content in the portion of the virtual background has not been received from the conference participant. The condition related to setting the portion of the virtual background based on the dynamic content is met may include that a time associated with displaying the dynamic content in the portion of the virtual background has not expired. The portion of the virtual background can be co-extensive with the virtual background. Implementations of the described techniques may include hardware, a method or process, or computer software on a computer-accessible medium.

One general aspect includes a device. The device includes a memory and a processor. The processor can be configured to execute instructions stored in the memory to receive, from a conference participant, an indication of a portion of a virtual background associated with dynamic content; receive, from the conference participant, a dynamic content source; and while a condition related to setting the portion of the virtual background based on the dynamic content is met, perform instructions to: obtain new content from the dynamic content source; generate an image associated with the conference participant that includes the new content within the portion of the virtual background; and transmit the image for display at a device of another conference participant of a conference that includes the conference participant. Other embodiments of this aspect include corresponding computer systems, apparatus, and computer programs recorded on one or more computer storage devices, each configured to perform the actions of the methods.

Implementations may include one or more of the following features. The device where the dynamic content source can be a whiteboard software. The instructions to obtain the new content from the dynamic content source may include instructions to query the dynamic content source for the new content. The instruction to obtain the new content from the dynamic content source may include instructions to receive the new content via a push of the new content from the dynamic content source. The condition related to setting the portion of the virtual background based on the dynamic content is met may include that a device of the conference participant has not disconnected from the conference. The condition related to setting the portion of the virtual background based on the dynamic content is met may include that an indication to stop including the dynamic content in the portion of the virtual background has not been received from the conference participant. The condition related to setting the portion of the virtual background based on the dynamic content is met may include that a time associated with displaying the dynamic content in the portion of the virtual background has not expired. The portion of the virtual background is co-extensive with the virtual background. Implementations of the described techniques may include hardware, a method or process, or computer software on a computer-accessible medium.

One general aspect includes a non-transitory computer readable medium storing instructions operable to cause one or more processors to perform operations. The operations include receiving, from a conference participant, an indication of a portion of a virtual background associated with dynamic content. The operations also include receiving, from the conference participant, a dynamic content source. The operations also include, while a condition related to setting the portion of the virtual background based on the dynamic content is met, performing steps may include: obtaining new content from the dynamic content source, generating an image associated with the conference participant that includes the new content within the portion of the virtual background, and transmitting the image for display at a device of another conference participant of a conference that includes the conference participant. Other embodiments of this aspect include corresponding computer systems, apparatus, and computer programs recorded on one or more computer storage devices, each configured to perform the actions of the methods.

Implementations may include one or more of the following features. The non-transitory computer readable medium where the condition related to setting the portion of the virtual background based on the dynamic content is met may include that a device of the conference participant has not disconnected from the conference. The condition related to setting the portion of the virtual background based on the dynamic content is met may include that an indication to stop including the dynamic content in the portion of the virtual background has not been received from the conference participant. The condition related to setting the portion of the virtual background based on the dynamic content is met may include that a time associated with displaying the dynamic content in the portion of the virtual background has not expired. Implementations of the described techniques may include hardware, a method or process, or computer software on a computer-accessible medium.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
receiving, from a conference participant via a user interface, an indication of a portion of a virtual background associated with dynamic content, wherein the indication comprises a bounding box indicating an area of the virtual background to be populated with the dynamic content;
receiving, from the conference participant, a dynamic content source comprising a whiteboard software and a viewport specification defining a portion of a whiteboard to be used as the dynamic content;
receiving, from the conference participant, a timeout period associated with setting the portion of the virtual background based on the dynamic content, wherein the timeout period determines when to stop setting the portion of the virtual background based on the dynamic content;
receiving, from the conference participant, representation handling criteria indicating placement of a representation of the conference participant in relation to the dynamic content;
while a condition related to setting the portion of the virtual background based on the dynamic content is met, the condition comprising that the timeout period has not expired, performing steps comprising:
obtaining new content from the dynamic content source;
generating an image associated with the conference participant that includes the new content within the portion of the virtual background, wherein generating the image comprises positioning the representation of the conference participant according to the representation handling criteria; and transmitting the image for display at a device of another conference participant of a conference that includes the conference participant; and
stopping setting the portion of the virtual background based on the dynamic content upon expiration of the timeout period.

2. The method of claim 1, wherein obtaining the new content from the dynamic content source comprises:
querying the dynamic content source for the new content.

3. The method of claim 1, wherein obtaining the new content from the dynamic content source comprises:
receiving the new content via a push of the new content from the dynamic content source.

4. The method of claim 1, wherein the condition related to setting the portion of the virtual background based on the dynamic content is met comprises that a device of the conference participant has not disconnected from the conference.

5. The method of claim 1, wherein the condition related to setting the portion of the virtual background based on the dynamic content is met comprises that an indication to stop including the dynamic content in the portion of the virtual background has not been received from the conference participant.

6. The method of claim 1, wherein the portion of the virtual background is co-extensive with the virtual background.

7. The method of claim 1, further comprising:
receiving, from the conference participant, a fitting criterion indicating how the new content should be adjusted to fit within the portion of the virtual background; and
adjusting a size of the new content according to the fitting criterion before generating the image.

8. The method of claim 1, further comprising:
receiving, from the conference participant, a size setting criterion indicating whether to automatically determine a size of a representation of the conference participant or to set the size of the representation based on a provided size, wherein generating the image comprises adjusting the size of the representation according to the size setting criterion.

9. The method of claim 1, wherein the conference comprises an immersive view displaying conference participants in a virtual environment, and the image is generated for display within the immersive view such that the conference participant appears to be physically co-located with other conference participants.

10. A device, comprising:
a memory; and
a processor, the processor configured to execute instructions stored in the memory to:
receive, from a conference participant via a user interface, an indication of a portion of a virtual background associated with dynamic content, wherein the indication comprises a bounding box indicating an area of the virtual background to be populated with the dynamic content;
receive, from the conference participant, a dynamic content source comprising a whiteboard software and a viewport specification defining a portion of a whiteboard to be used as the dynamic content;
receive, from the conference participant, a timeout period associated with setting the portion of the virtual background based on the dynamic content, wherein the timeout period determines when to stop setting the portion of the virtual background based on the dynamic content;

receive, from the conference participant, representation handling criteria indicating placement of a representation of the conference participant in relation to the dynamic content;

while a condition related to setting the portion of the virtual background based on the dynamic content is met, the condition comprising that the timeout period has not expired, perform instructions to:

obtain new content from the dynamic content source;

generate an image associated with the conference participant that includes the new content within the portion of the virtual background, wherein to generate the image comprises to position the representation of the conference participant according to the representation handling criteria; and transmit the image for display at a device of another conference participant of a conference that includes the conference participant; and stop setting the portion of the virtual background based on the dynamic content upon expiration of the timeout period.

11. The device of claim 10, wherein the instructions to obtain the new content from the dynamic content source comprise instructions to:

query the dynamic content source for the new content.

12. The device of claim 10, wherein the instructions to obtain the new content from the dynamic content source comprise instructions to:

receive the new content via a push of the new content from the dynamic content source.

13. The device of claim 10, wherein the condition related to setting the portion of the virtual background based on the dynamic content is met comprises that a device of the conference participant has not disconnected from the conference.

14. The device of claim 10, wherein the condition related to setting the portion of the virtual background based on the dynamic content is met comprises that an indication to stop including the dynamic content in the portion of the virtual background has not been received from the conference participant.

15. The device of claim 10, wherein the portion of the virtual background is co-extensive with the virtual background.

16. A non-transitory computer readable medium storing instructions operable to cause one or more processors to perform operations comprising:

receiving, from a conference participant via a user interface, an indication of a portion of a virtual background associated with dynamic content, wherein the indication comprises a bounding box indicating an area of the virtual background to be populated with the dynamic content;

receiving, from the conference participant, a dynamic content source comprising a whiteboard software and a viewport specification defining a portion of a whiteboard to be used as the dynamic content;

receiving, from the conference participant, a timeout period associated with setting the portion of the virtual background based on the dynamic content, wherein the timeout period determines when to stop setting the portion of the virtual background based on the dynamic content;

receiving, from the conference participant, representation handling criteria indicating placement of a representation of the conference participant in relation to the dynamic content;

while a condition related to setting the portion of the virtual background based on the dynamic content is met, the condition comprising that the timeout period has not expired, performing steps comprising:

obtaining new content from the dynamic content source;

generating an image associated with the conference participant that includes the new content within the portion of the virtual background, wherein generating the image comprises positioning the representation of the conference participant according to the representation handling criteria; and transmitting the image for display at a device of another conference participant of a conference that includes the conference participant; and stopping setting the portion of the virtual background based on the dynamic content upon expiration of the timeout period.

17. The non-transitory computer readable medium of claim 16, wherein the condition related to setting the portion of the virtual background based on the dynamic content is met comprises that a device of the conference participant has not disconnected from the conference.

18. The non-transitory computer readable medium of claim 16, wherein the condition related to setting the portion of the virtual background based on the dynamic content is met comprises that an indication to stop including the dynamic content in the portion of the virtual background has not been received from the conference participant.

19. The non-transitory computer readable medium of claim 16, wherein obtaining the new content from the dynamic content source comprises:

registering a callback function with the whiteboard software to receive notifications of content changes within the viewport specification, wherein the whiteboard software is configured to transmit notifications through the callback function when an edit to the whiteboard results in modifications to any portion of the viewport specification.

* * * * *